United States Patent
Liao et al.

(10) Patent No.: US 7,554,602 B2
(45) Date of Patent: Jun. 30, 2009

(54) PROCESSING INTERLACED VIDEO IN A FRAME BASED RENDERING SYSTEM

(75) Inventors: Bin Liao, Cheltenham (AU); Farris Junius Halim, Kingsford (AU)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 11/175,204

(22) Filed: Jul. 7, 2005

(65) Prior Publication Data
US 2006/0007352 A1    Jan. 12, 2006

(30) Foreign Application Priority Data
Jul. 12, 2004  (AU)  ............................... 2004903821

(51) Int. Cl.
*H04N 7/01* (2006.01)
(52) U.S. Cl. ...................................... 348/441
(58) Field of Classification Search ................. 348/441, 348/448, 449, 459, 558, 607; 382/236
See application file for complete search history.

(56) References Cited

U.S. PATENT DOCUMENTS

| | | | | |
|---|---|---|---|---|
| 5,633,687 | A * | 5/1997 | Bhayani et al. | ............. 348/441 |
| 5,910,795 | A * | 6/1999 | Whittaker | .................... 345/669 |
| 6,069,664 | A |  5/2000 | Zhu et al. | ................... 348/448 |
| 6,317,158 | B1 * | 11/2001 | Tice | ............................ 348/447 |
| 6,392,712 | B1 |  5/2002 | Gryskiewicz et al. | ....... 348/584 |
| 6,983,019 | B2 * | 1/2006 | Yiwen et al. | ........... 375/240.16 |
| 6,992,725 | B2 * | 1/2006 | Mohsenian | .................. 348/448 |
| 2003/0001862 | A1 | 1/2003 | Chu et al. | ..................... 345/611 |
| 2005/0053295 | A1 * | 3/2005 | Holcomb | ..................... 382/236 |
| 2005/0053296 | A1 * | 3/2005 | Srinivasan et al. | .......... 382/236 |

FOREIGN PATENT DOCUMENTS

EP    0 785 683 A2    7/1997

OTHER PUBLICATIONS

Australian Notice of Acceptance dated Jul. 2, 2008, regarding Application No. 2005203001.

* cited by examiner

*Primary Examiner*—Paulos M Natnael
(74) *Attorney, Agent, or Firm*—Fitzpatrick, Cella, Harper & Scinto

(57) ABSTRACT

A change in field order between an input video frame and an output video frame or an input video frame being displaced by an odd number of scan-lines with respect to an output video frame, may introduce out of order fields in the output video frame. A method (700), apparatus and computer program product for generating an interlaced video stream from one or more interlaced input video streams and graphical objects is disclosed. The method (700) enables input video streams to be transformed (e.g., scaled and translated) to generate an interlaced video stream. The method (700) ensure that the fields of an output video frame are in correct order by shifting a corresponding input video frame down by one scan-line.

28 Claims, 16 Drawing Sheets

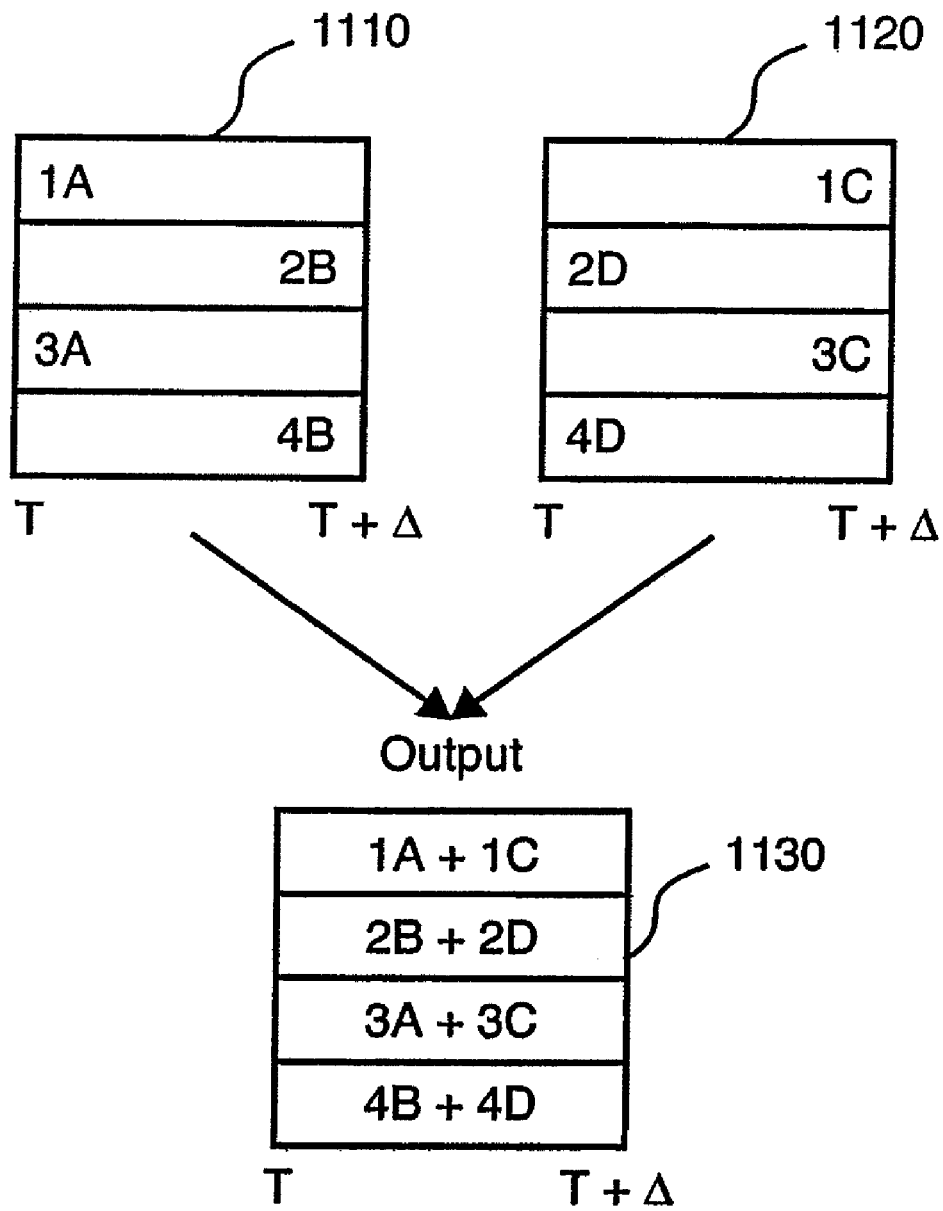
Fig. 11 - Prior Art

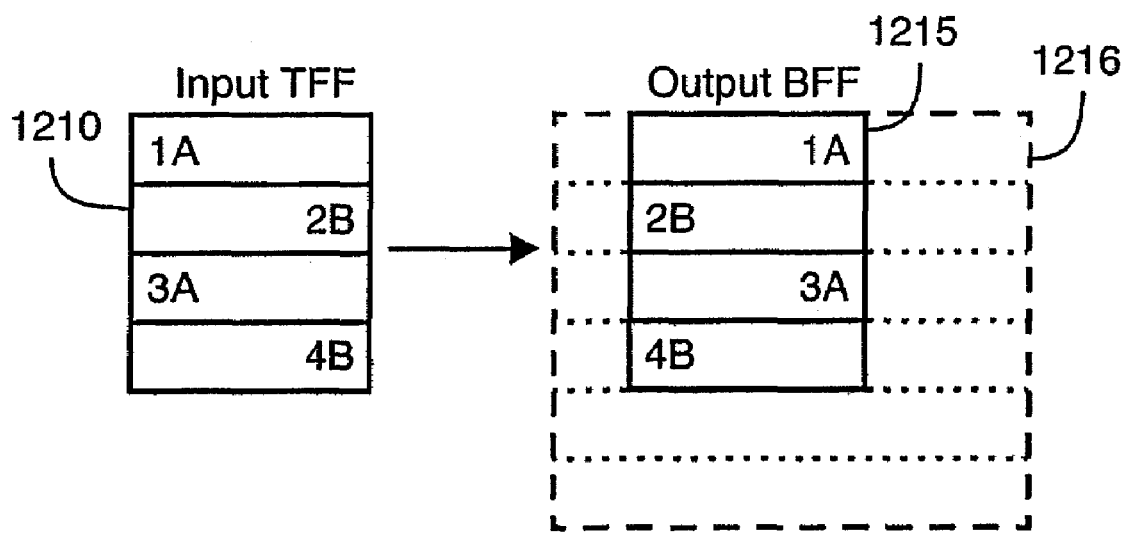
Fig. 12A - Prior Art
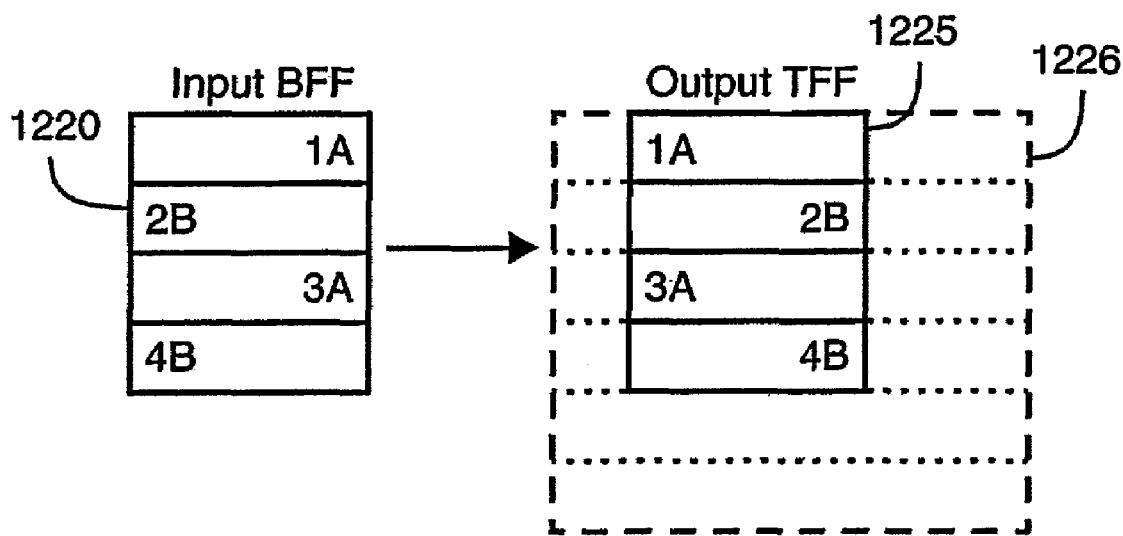
Fig. 12B - Prior Art

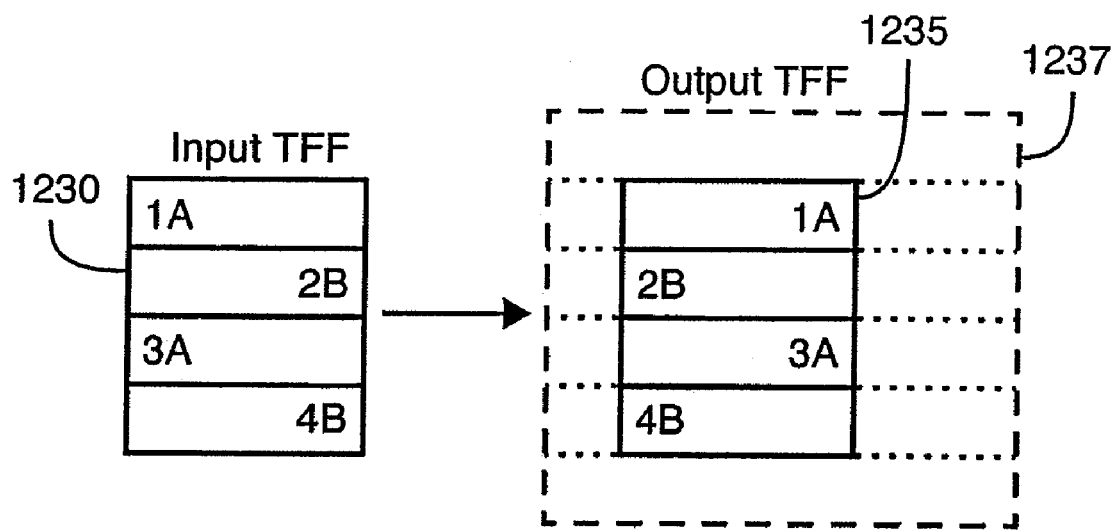
Fig. 12C - Prior Art
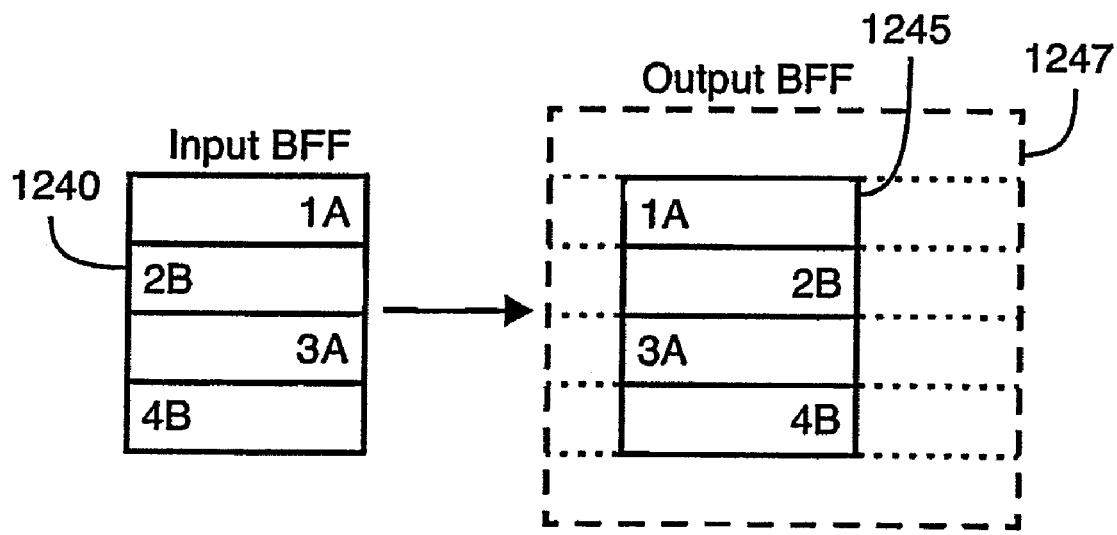
Fig. 12D - Prior Art

PROCESSING INTERLACED VIDEO IN A FRAME BASED RENDERING SYSTEM

CROSS-REFERENCE TO RELATED PATENT APPLICATIONS

This application claims the right of priority under 35 U.S.C. § 119 based on Australian Patent Application No. 2004903821, filed 12 Jul. 2004, which is incorporated by reference herein in its entirety as if fully set forth herein.

FIELD OF THE INVENTION

The present invention relates generally to video images and, in particular, to a method and apparatus for generating an interlaced video frame. The present invention also relates to a computer program product including a computer readable medium having recorded thereon a computer program for generating an interlaced video frame.

BACKGROUND

Digital video cameras have become very popular in recent times. Many of these cameras and, in particular, the mini-digital video (mini-DV) type of digital cameras, produce frames of a video sequence (or "stream") in interlaced format as opposed to progressive video format.

An interlaced video frame comprises two fields, which are captured at successive times and are separated by a regular interval. A dominant field of the frame is captured at time T and a corresponding non-dominant field is captured at time T+Δ, where Δ represents field period, which is equal to half the frame period. Therefore, the dominant field of a video frame occurs prior to the non-dominant field in time. This is referred to as "field order". For the purpose of playing back one or more interlaced video frames, the dominant field of a particular frame is always displayed before a corresponding non-dominant field.

Video frames may be formatted according to either one of two types of field order, referred to as 'Top Field First (TFF)' and 'Bottom Field First (BFF)'. The top field of a video frame comprises scan-lines 1, 3, 5 . . . etc, when counting from the top row of a video frame. The bottom field of a video frame comprises scan-lines 2, 4, 6 . . . etc, again, when counting from the top row of a video frame. In TFF formatted video frames, the dominant field is the top field of the video frame and the non-dominant field is the bottom field. Conversely, in BFF formatted video frames, the bottom field forms the dominant field and the top field forms the non-dominant field.

When editing video sequences produced by a digital video camera, often users wish to apply effects to one or more frames of the video sequence. Sometimes users wish to combine multiple input video sequences to produce a single output video sequence. For example, a user may wish to produce a picture-in-picture video display sequence out of two input video sequences. Sometimes, users also wish to export an edited video sequence back to a mini-DV tape for archiving or to be played back on a television, for example.

When editing an input video sequence to generate an output video sequence, it is important that the field order of the input video sequence(s) is preserved. That is, if field A of an input video frame occurs before field B of the input video frame, then the corresponding fields A and B of a corresponding output video frame must be in the same order.

In certain circumstances, maintaining the field order of the frames of a video sequence can be a problem. Firstly, output video frames of a sequence of frames may have a different field order to the corresponding input video frames. For example, the frames of the input video sequence may be formatted as TFF while the required output field order may be BFF. Secondly, input video frames of a plurality of video sequences being used to produce a single output video sequence may have different field orders to one another. For example, the frames of one or more input video sequences may be TFF formatted and the frames of the other input video sequence(s) may be BFF, while the required output field order may be either TFF or BFF. Still further, scaling and/or translation applied to the frames of an input video sequence may affect the field order of the video sequences. In each of these circumstances, the field order of the input video frames may be reversed in corresponding output video frames.

As an example, FIG. 11 shows a TFF formatted input video frame 1110. As seen in FIG. 11, the top field (i.e., scan-lines 1A, 3A . . . etc) of the video frame 1110 is shown drawn on the left-hand side of the frame 1110. The bottom field (i.e., scan-lines 2B, 4B . . . etc) is shown drawn on the right-hand side of the frame 1110. In the example of FIG. 11, the top field is displayed at time, T, before the bottom field, which is displayed at time T+Δ. FIG. 11 also shows a second video frame 1120, which has a BFF field order. For the frame 1120, the bottom field (i.e., scan-lines 2D, 4D . . . etc) is drawn on the left of the frame 1120 and the top field (i.e., scan-lines 1C, 3C . . . etc) is drawn on the right of the frame 1120.

In the example of FIG. 11, the two video frames 1110 and 1120 having different field orders are combined to generate an interlaced output video frame 1130, in accordance with a conventional method. The generated output video frame 1130 is a blend of the two input video frames 1110 and 1120. As seen in FIG. 11, the problem with the video frame 1130 is that the top field (i.e., scanlines 1A+1C, 3A+3C . . . etc) of the video frame 1130 comprises the top field (i.e., scanlines 1A, 3A . . . etc) of the video frame 1110, which occurs at time T, and the top field (i.e., scanlines 1C, 3C . . . etc) of the video frame 1120, which occurs at time T+Δ. Further, the bottom field (i.e., scanlines 2B+2D, 4B+4D . . . etc) of the video frame 1130 comprises the bottom field (i.e., scanlines 2B, 4B . . . etc) of the video frame 1110, which occurs at time T+Δ, and the bottom field (i.e., scanlines 2D, 4D . . . etc) of the video frame 1120, which occurs at time T.

As another example, FIGS. 12A and 12B show video frames 1210 and 1220, respectively. The video frame 1210 is formatted as TFF and the video frame 1220 is formatted as BFF. Output video frames 1215 and 1225 corresponding to the video frames 1210 and 1220, respectively, are also shown in FIGS. 12A and 12B. The output video frames 1215 and 1225 have been generated in accordance with conventional methods and are shown in output buffers 1216 and 1226, respectively. The output video frame 1215 is formatted as BFF and the output video frame 1225 is formatted as TFF. As seen in FIGS. 12A and 12B, the fields (i.e., scanlines 1A, 2B, 3A, 4B . . . etc) of the output video frames 1215 and 1225 are in reversed order compared to their corresponding input video frames 1210 and 1220, respectively. For example, the top field (i.e., scanlines 1A, 3A . . . etc) of the video frame 1210 that should be displayed at time T is displayed at time T+Δ.

FIGS. 12C and 12D show video frames 1230 and 1240, respectively. The video frame 1230 is formatted as TFF and the video frame 1240 is formatted as BFF. The output video frames 1235 and 1245 corresponding to the input video frames 1230 and 1240, respectively, are also shown in FIGS. 12C and 12D. The output video frames 1235 and 1245 are shown in output buffers 1237 and 1247, respectively. The video frame 1235 is formatted as TFF and the video frame 1240 is formatted as BFF. That is, the field order of the input frames 1230 and 1240 is the same as that of their corresponding output frames 1235 and 1245, respectively. However, in the example of FIGS. 12C and 12D, the output video frames 1235 and 1245 are generated at a vertical displacement of one scan-line in their corresponding output buffers 1237 and 1247, respectively. As seen in FIGS. 12C and 12D, the fields (i.e., scanlines 1A, 2B, 3A, 4B1 . . . etc) of the output video frames 1235 and 1245 are in reversed order compared to their corresponding input video frames 1230 and 1240, respectively. For example, the top field (i.e., scanlines 1A, 3A . . . etc) of the video frame 1230 that should be displayed at time T is displayed at time T+Δ.

There are several known methods used by software applications when processing interlaced video frames in order to overcome the above problems. In one of these known methods, the input video frames may be de-interlaced and such that processing occurs on progressive frames. In this instance, the progressive frames need to be re-interlaced in appropriate order to produce an interlaced output. A problem with such a method is that two conversions (i.e., the de-interlace and re-interlace processes) need to be performed. Further, information may be lost during these conversions.

Other known methods of processing interlaced video frames lack support for different field orders between input video frames and corresponding output video frames. Such methods are also typically not able to combine multiple input video frames interlaced in different formats (e.g., TFF or BFF). Finally, such methods typically do not support scaling and translation operations.

Thus a need clearly exists for a more efficient and accurate method of generating one or more interlaced video frames.

SUMMARY

It is an object of the present invention to substantially overcome, or at least ameliorate, one or more disadvantages of existing arrangements.

According to one aspect of the present invention there is provided a method of generating an interlaced video frame from one or more input video frames, said method comprising the steps of:

interpolating a dominant field of each of said one or more input video frames;

rendering each of the interpolated dominant fields;

interpolating a non-dominant field of each of said one or more input video frames;

rendering each of the interpolated non-dominant fields; and generating said interlaced video frame by combining the rendered dominant and non-dominant fields.

According to another aspect of the present invention there is provided a method of generating an interlaced video frame from one or more input video frames, said method comprising the steps of:

interpolating a dominant field of each of said one or more input video frames;

rendering each of the interpolated dominant fields to form a first rendered frame;

interpolating a non-dominant field of each of said one or more input video frames;

rendering each of the interpolated non-dominant fields to form a second rendered frame;

selecting a dominant output field from said first rendered frame;

selecting a non-dominant output field from said second rendered frame; and generating said interlaced video frame by combining the selected dominant and non-dominant output fields.

According to still another aspect of the present invention there is provided a method of generating an interlaced video frame from one or more input video frames, said method comprising the steps of:

copying a dominant field of each of said one or more input video frames into a corresponding non-dominant field position to form one or more interpolated video frames;

copying a non-dominant field of each of said one or more input video frames into a corresponding dominant field position to form one or more further interpolated video frames;

rendering each of said one or more interpolated video frames and said one or more further interpolated video frames; and generating said interlaced video frame by combining the rendered interpolated video frames.

According to still another aspect of the present invention there is provided a method of outputting one or more video fields from one or more input video frames, said method comprising the steps of:

interpolating a dominant field of each of said one or more input video frames;

rendering each of the interpolated dominant fields to form a first rendered frame;

interpolating a non-dominant field of each of said one or more input video frames;

rendering each of the interpolated non-dominant fields to form a second rendered frame;

selecting a dominant output field from said first rendered frame;

selecting a non-dominant output field from said second rendered frame; and outputting said one or more dominant output field and said one or more non-dominant output field.

According to still another aspect of the present invention there is provided an apparatus for generating an interlaced video frame from one or more input video frames, said apparatus comprising:

dominant field interpolation means for interpolating a dominant field of each of said one or more input video frames;

first rendering means for rendering each of the interpolated dominant fields;

non-dominant field interpolation means for interpolating a non-dominant field of each of said one or more input video frames;

second rendering means for rendering each of the interpolated non-dominant fields; and video generating means for generating said interlaced video frame by combining the rendered dominant and non-dominant fields.

According to still another aspect of the present invention there is provided an apparatus for generating an interlaced video frame from one or more input video frames, said apparatus comprising:

dominant field interpolation means for interpolating a dominant field of each of said one or more input video frames;

first rendering means for rendering each of the interpolated dominant fields to form a first rendered frame;

non-dominant field interpolation means for interpolating a non-dominant field of each of said one or more input video frames;

second rendering means for rendering each of the interpolated non-dominant fields to form a second rendered frame;

dominant output field selection means for selecting a dominant output field from said first rendered frame;

non-dominant output field selection means for selecting a non-dominant output field from said second rendered frame; and video generating means for generating said interlaced video frame by combining the selected dominant and non-dominant output fields.

According to still another aspect of the present invention there is provided an apparatus for generating an interlaced video frame from one or more input video frames, said apparatus comprising:

dominant field copying means for copying a dominant field of each of said one or more input video frames into a corresponding non-dominant field position to form one or more interpolated video frames;

non-dominant field copying means for copying a non-dominant field of each of said one or more input video frames into a corresponding dominant field position to form one or more further interpolated video frames;

rendering means for rendering each of said one or more interpolated video frames and said one or more further interpolated video frames; and video generating means for generating said interlaced video frame by combining the rendered interpolated video frames.

According to still another aspect of the present invention there is provided an apparatus for outputting one or more video fields from one or more input video frames, said apparatus comprising:

dominant field interpolation means for interpolating a dominant field of each of said one or more input video frames;

first rendering means for rendering each of the interpolated dominant fields to form a first rendered frame;

non-dominant field interpolation means for interpolating a non-dominant field of each of said one or more input video frames;

second rendering means for rendering each of the interpolated non-dominant fields to form a second rendered frame;

dominant output field selection means for selecting a dominant output field from said first rendered frame;

non-dominant output field selection means for selecting a non-dominant output field from said second rendered frame; and field output means for outputting said one or more dominant output field and said one or more non-dominant output field.

According to still another aspect of the present invention there is provided a program for generating an interlaced video frame from one or more input video frames, said program comprising:

code for interpolating a dominant field of each of said one or more input video frames;

code for rendering each of the interpolated dominant fields;

code for interpolating a non-dominant field of each of said one or more input video frames;

code for rendering each of the interpolated non-dominant fields; and code for generating said interlaced video frame by combining the rendered dominant and non-dominant fields.

According to still another aspect of the present invention there is provided a program for generating an interlaced video frame from one or more input video frames, said program comprising:

code for interpolating a dominant field of each of said one or more input video frames;

code for rendering each of the interpolated dominant fields to form a first rendered frame;

code for interpolating a non-dominant field of each of said one or more input video frames;

code for rendering each of the interpolated non-dominant fields to form a second rendered frame;

code for selecting a dominant output field from said first rendered frame;

code for selecting a non-dominant output field from said second rendered frame; and code for generating said interlaced video frame by combining the selected dominant and non-dominant output fields.

According to still another aspect of the present invention there is provided a program for generating an interlaced video frame from one or more input video frames, said program comprising:

code for copying a dominant field of each of said one or more input video frames into a corresponding non-dominant field position to form one or more interpolated video frames;

code for copying a non-dominant field of each of said one or more input video frames into a corresponding dominant field position to form one or more further interpolated video frames;

code for rendering each of said one or more interpolated video frames and said one or more further interpolated video frames; and code for generating said interlaced video frame by combining the rendered interpolated video frames.

According to still another aspect of the present invention there is provided a program for outputting one or more video fields from one or more input video frames, said program comprising:

code for interpolating a dominant field of each of said one or more input video frames;

code for rendering each of the interpolated dominant fields to form a first rendered frame;

code for interpolating a non-dominant field of each of said one or more input video frames;

code for rendering each of the interpolated non-dominant fields to form a second rendered frame;

code for selecting a dominant output field from said first rendered frame;

code for selecting a non-dominant output field from said second rendered frame; and code for outputting said one or more dominant output field and said one or more non-dominant output field.

According to still another aspect of the present invention there is provided a computer program product having a computer readable medium having a computer program recorded therein for generating an interlaced video frame from one or more input video frames, said computer program product comprising:

computer program code means for interpolating a dominant field of each of said one or more input video frames;

computer program code means for rendering each of the interpolated dominant fields;

computer program code means for interpolating a non-dominant field of each of said one or more input video frames;

computer program code means for rendering each of the interpolated non-dominant fields; and computer program code means for generating said interlaced video frame by combining the rendered dominant and non-dominant fields.

According to still another aspect of the present invention there is provided a computer program product having a computer readable medium having a computer program recorded therein for generating an interlaced video frame from one or more input video frames, said computer program product comprising:

computer program code means for interpolating a dominant field of each of said one or more input video frames;

computer program code means for rendering each of the interpolated dominant fields to form a first rendered frame;

computer program code means for interpolating a non-dominant field of each of said one or more input video frames;

computer program code means for rendering each of the interpolated non-dominant fields to form a second rendered frame;

computer program code means for selecting a dominant output field from said first rendered frame;

computer program code means for selecting a non-dominant output field from said second rendered frame; and computer program code means for generating said interlaced video frame by combining the selected dominant and non-dominant output fields.

According to still another aspect of the present invention there is provided a computer program product having a computer readable medium having a computer program recorded therein for generating an interlaced video frame from one or more input video frames, said computer program product comprising:

computer program code means for copying a dominant field of each of said one or more input video frames into a corresponding non-dominant field position to form one or more interpolated video frames;

computer program code means for copying a non-dominant field of each of said one or more input video frames into a corresponding dominant field position to form one or more further interpolated video frames;

computer program code means for rendering each of said one or more interpolated video frames and said one or more further interpolated video frames; and computer program code means for generating said interlaced video frame by combining the rendered interpolated video frames.

According to still another aspect of the present invention there is provided a computer program product having a computer readable medium having a computer program recorded therein for outputting one or more video fields from one or more input video frames, said computer program product comprising:

computer program code means for interpolating a dominant field of each of said one or more input video frames;

computer program code means for rendering each of the interpolated dominant fields to form a first rendered frame;

computer program code means for interpolating a non-dominant field of each of said one or more input video frames;

computer program code means for rendering each of the interpolated non-dominant fields to form a second rendered frame;

computer program code means for selecting a dominant output field from said first rendered frame;

computer program code means for selecting a non-dominant output field from said second rendered frame; and computer program code means for outputting said one or more dominant output field and said one or more non-dominant output field.

Other aspects of the invention are also disclosed.

BRIEF DESCRIPTION OF THE DRAWINGS

Some aspects of the prior art and one or more embodiments of the present invention will now be described with reference to the drawings and appendices, in which:

FIG. 11 shows an interlaced video frame generated from two input video frames having different field orders;

FIGS. 12A and 12B show interlaced output video frames generated from corresponding input video frames having different field orders to the corresponding output video frames;

FIGS. 12C and 12D show interlaced output video frames generated from input video frames having the same field order to corresponding output video frames, where the output video frames are generated at a vertical displacement of one scan-line in corresponding output video windows;

DETAILED DESCRIPTION INCLUDING BEST MODE

Figure 1:
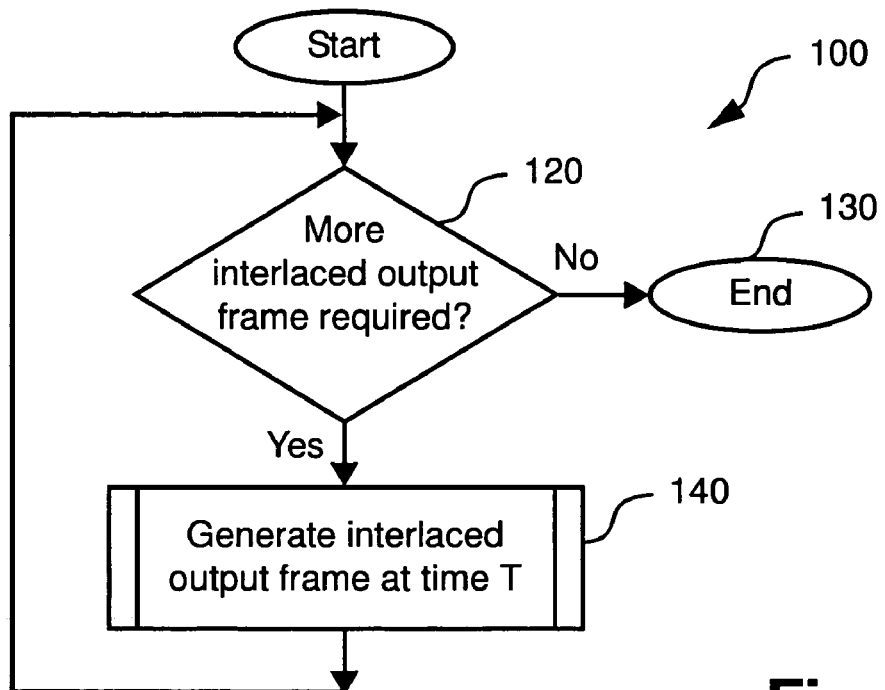
FIG. 1 is a flow diagram showing a method of generating an interlaced video stream according to a compositing tree.
Figure 2:
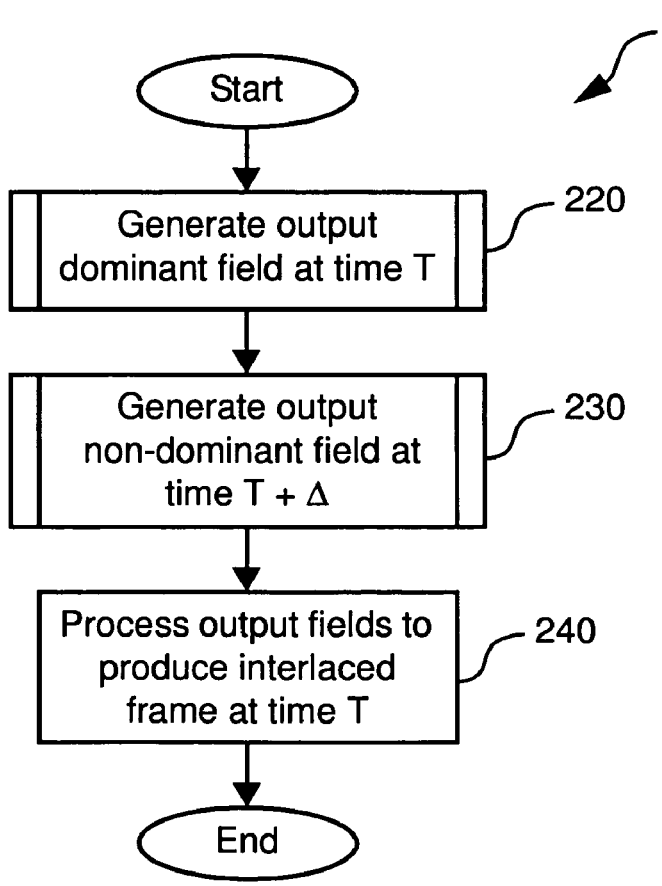
FIG. 2 is a flow diagram showing a method of generating the interlaced video frame of FIG. 1 at time T, as executed in the method of FIG. 1.

Where reference is made in any one or more of the accompanying drawings to steps and/or features, which have the same reference numerals, those steps and/or features have for the purposes of this description the same function(s) or operation(s), unless the contrary intention appears.

Methods for generating interlaced video frames are described below with reference to FIGS. 1 to 10 and 13 through to 19. In particular, a method 700 of generating an interlaced video stream from one or more interlaced input video streams and graphical objects is described with reference to FIG. 7. The methods described below enable input video streams to be transformed (e.g., scaled and translated) to generate an interlaced video stream.

A change in field order between an input video frame and an output video frame or an input video frame being displaced by an odd number of scan-lines with respect to an output video frame, may introduce out of order fields in the output video frame. The methods described below ensure that the fields of an output video frame are in correct order by shifting a corresponding input video frame down by one scan-line.

The methods described below may be used whether or not an input video frame is displaced with respect to the output video frame. For example, the described methods may be used where an input video frame and a corresponding output video frame have the same field order and are not vertically displaced with respect to other.

Figure 17:
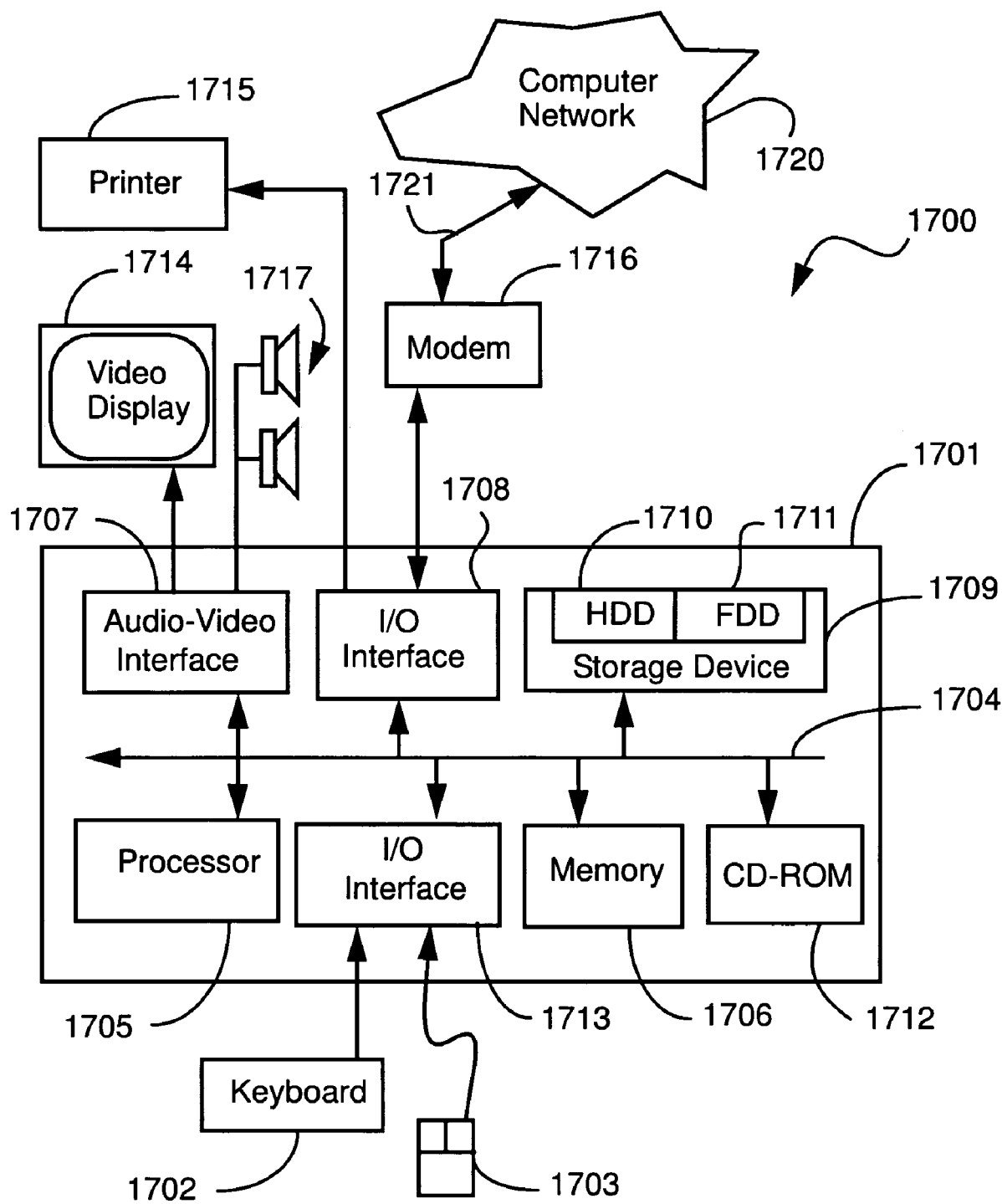
FIG. 17 is a schematic block diagram of a general-purpose computer upon which arrangements described can be practiced.

The described methods are preferably practiced using a general-purpose computer system 1700, such as that shown in FIG. 17 wherein the processes of FIGS. 1 to 10 may be implemented as software, such as an application program executing within the computer system 1700. In particular, the steps of the described methods may be effected by instructions in the software that are carried out by the computer. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the described methods.

The computer system 1700 is formed by a computer module 1701, input devices such as a keyboard 1702 and mouse 1703, output devices including a printer 1715, a display device 1714 and loudspeakers 1717. A Modulator-Demodulator (Modem) transceiver device 1716 is used by the computer module 1701 for communicating to and from a communications network 1720, for example connectable via a telephone line 1721 or other functional medium. The modem 1716 can be used to obtain access to the Internet, and other network systems, such as a Local Area Network (LAN) or a Wide Area Network (WAN), and may be incorporated into the computer module 1701 in some implementations.

The computer module 1701 typically includes at least one processor unit 1705, and a memory unit 1706, for example formed from semiconductor random access memory (RAM) and read only memory (ROM). The module 1701 also includes an number of input/output (I/O) interfaces including an audio-video interface 1707 that couples to the video display 1714 and loudspeakers 1717, an I/O interface 1713 for the keyboard 1702 and mouse 1703 and optionally a joystick (not illustrated), and an interface 1708 for the modem 1716 and printer 1715. In some implementations, the modem 1716 may be incorporated within the computer module 1701, for example within the interface 1708. A storage device 1709 is provided and typically includes a hard disk drive 1710 and a floppy disk drive 1711. A magnetic tape drive (not illustrated) may also be used. A CD-ROM drive 1712 is typically provided as a non-volatile source of data. The components 1705 to 1713 of the computer module 1701, typically communicate via an interconnected bus 1704 and in a manner which results in a conventional mode of operation of the computer system 1700 known to those in the relevant art. Examples of computers on which the described arrangements can be practised include IBM-PC's and compatibles, Sun Sparcstations or alike computer systems evolved therefrom.

Typically, the application program is resident on the hard disk drive 1710 and read and controlled in its execution by the processor 1705. Intermediate storage of the program and any data fetched from the network 1720 may be accomplished using the semiconductor memory 1706, possibly in concert with the hard disk drive 1710. In some instances, the application program may be supplied to the user encoded on a CD-ROM or floppy disk and read via the corresponding drive 1712 or 1711, or alternatively may be read by the user from the network 1720 via the modem device 1716. Still further, the software can also be loaded into the computer system 1700 from other computer readable media. The term "computer readable medium" as used herein refers to any storage or transmission medium that participates in providing instructions and/or data to the computer system 1700 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1701. Examples of transmission media include radio or infra-red transmission channels as well as a network connection to another computer or networked device, and the Internet or Intranets including e-mail transmissions and information recorded on Websites and the like.

The described methods may alternatively be implemented in dedicated hardware such as one or more integrated circuits performing the functions or sub functions of the processes of FIGS. 1 to 10 and 13 to 19. Such dedicated hardware may include graphic processors, digital signal processors or one or more microprocessors and associated memories.

As described above, the method 700 generates an interlaced output video stream from one or more interlaced input video streams and graphical objects. The method 700 utilises a compositing tree to describe the interlaced output video stream. The compositing tree represents the output video stream in terms of its constituent elements and facilitates later rendering. The compositing tree comprises a plurality of nodes including leaf nodes, unary nodes and binary nodes. Nodes of higher degree, or of alternative definition may also be used.

The leaf nodes are the outer most nodes of the compositing tree and have no descendent nodes. The leaf nodes represent a primitive constituent of the output video stream such as one or more interlaced output video streams or a graphical object. In the instance where a leaf nodes represents one or more interlaced output video streams, the leaf node is referred herein to as a 'video node.' A leaf node representing a graphical object is referred to herein as a 'graphical object node.' A video node may include one or more references to frame buffers in memory 1706, for example. Each of the frame buffers may contain image data representing a particular frame of a video stream. Similarly, a graphical object node may include one or more references to image data stored in memory 1706 and representing one or more graphical objects, for example.

A unary node represents an operation which modifies one or more output video streams and/or graphical objects associated with a part of the compositing tree below the operator associated with the unary node. Unary nodes include such operations as colour conversions, convolutions (e.g., blurring etc) and operations such as red-eye removal.

A binary node typically branches to left and right subtrees, wherein each subtree is itself a compositing tree comprising at least one leaf node. Binary nodes represent an operation which combines one or more output video streams and/or graphical objects of the two children of the binary node to form a single result. For example, a binary node may be one of the standard "compositing operators" such as OVER, IN, OUT, ATOP and alpha-XOR.

Figure 7:
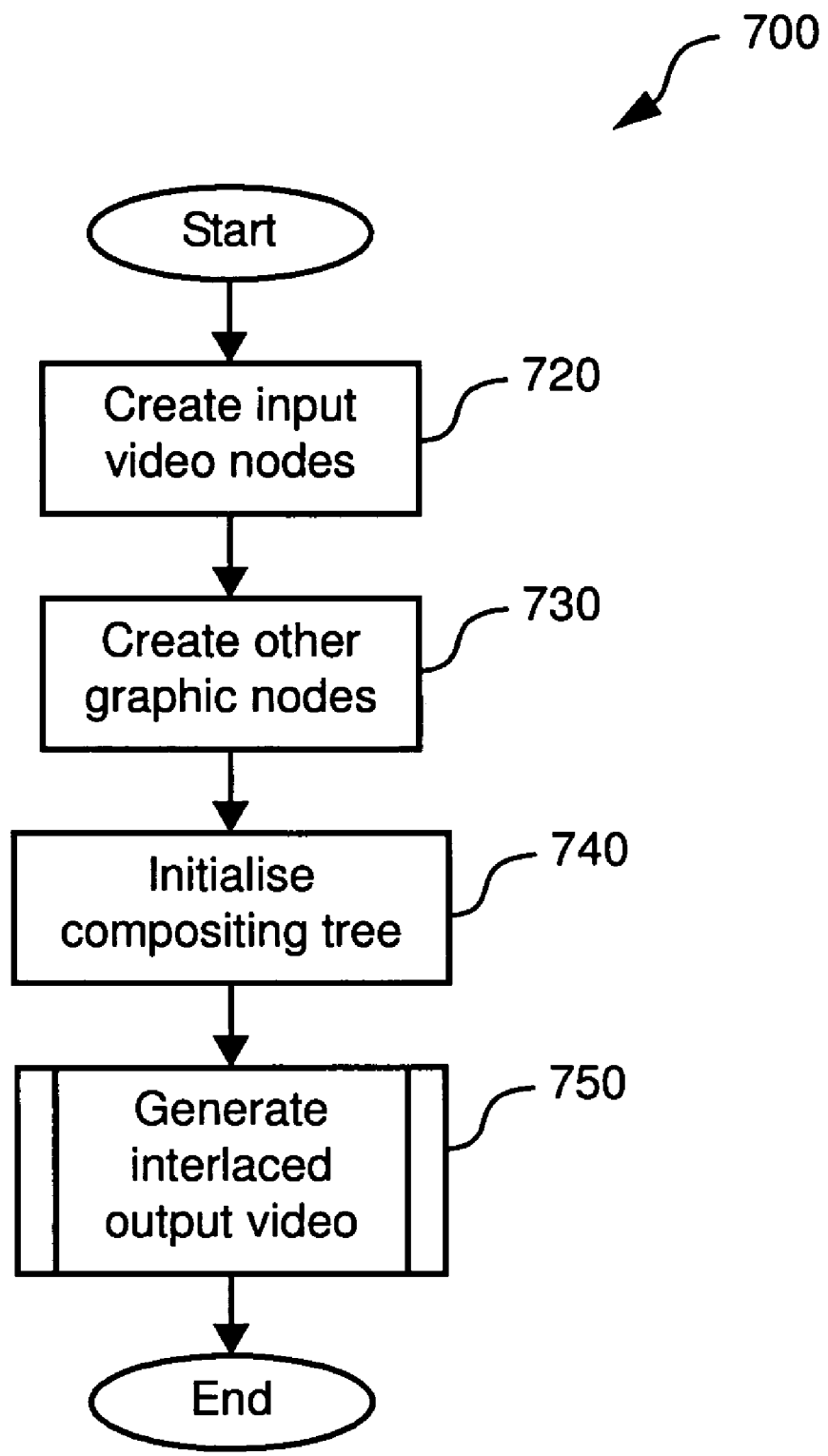
FIG. 7 is a flow diagram showing a method of generating an interlaced video stream.

The method 700 will now be described in more detail with reference to FIG. 7. The method 700 may be implemented as software resident on the hard disk drive 1710 and being controlled in its execution by the processor 1705. As described above, the method 700 generates an interlaced output video stream from one or more interlaced input video streams and graphical objects. In accordance with the method 700, the fields of a plurality of input interlaced video streams may be combined to form an output interlaced video stream. The output interlaced video stream may be stored in memory 1706 and may be associated with a video node.

The input interlaced video streams may be sourced from a file stored in memory 1706 or the hard disk drive 1710. The input interlaced video streams may also be streamed video transmitted over the communications network 1720 or video captured from an external source such as a mini-DV camera, for example. As described above, the method 700 may also process one or more graphical objects The method 700 begins at step 720, where the processor 1705 generates one or more input video nodes from one or more input interlaced video streams. Each of these input video nodes comprises one or more interlaced video frames consisting of dominant and non-dominant fields. At the next step 730, the processor 1705 generates one or more graphical object nodes for any input graphical objects detected by the processor 1705. Each of these graphical object nodes comprises a (filled or unfilled) path, a still (bitmap) image, text characters, etc. Then at step 740, the processor 1705 generates a compositing tree, using the input video nodes and graphical object nodes, to represent the interlaced output video stream.

In generating the compositing tree, the processor 1705 may include one or more binary nodes describing operations to be performed on the input interlaced video streams and graphical objects. The processor 1705 may also include one or more unary nodes describing transformations to be performed on the input interlaced video streams and graphical objects. The operations and/or transformations included in the compositing tree will depend on the interlaced video stream to be output. For example, one or more video streams may be displayed side by side with subtitle text composited on top of the video streams. This may be achieved by translating the input video streams represented by the input video nodes to a desired location in an output video bounding box or buffer configured in memory 1706. A graphical object node representing the subtitle text may then be composited on top of the video streams using an OVER operator.

The method 700 concludes at the next step 750 where the processor 1705 generates the output interlaced video stream according to the compositing tree generated at step 740. As described above, the output interlaced video stream may be stored in a frame buffer configured in memory 1706, for example. A method 100 of generating the output interlaced video stream, as executed at step 750, according to the generated compositing tree, will be described directly below with reference to FIG. 1. The method 100 may be implemented using a two-dimensional rendering system being executed by the processor 1705, for example.

The method 100 may be implemented as software resident on the hard disk drive 1710 and being controlled in its execution by the processor 1705. The method 100 begins at step 120, where if the processor 1705 determines that there are more output frames required to be generated, then the method 100 proceeds to step 140. Otherwise, the method 100 concludes at step 130. At step 140, the processor 1705 generates the interlaced output frame according to the compositing tree that was generated at step 740. The method 100 then returns to step 120, to determine if there are any more output frames required to be generated. The first output frame generated at step 140 is generated at time, T=0. Subsequent output frames may then be generated at time, T, where T increases by a predetermined frame period (e.g. ¹⁄₂₅ second) for each subsequent frame. The compositing tree may be updated for each of these subsequent frames. A method 200 of generating the output interlaced video frame at time T, as executed at step 140, will be described directly below with reference to FIG. 2.

The method 200 may be implemented as software resident on the hard disk drive 1710 and being controlled in its execution by the processor 1705. As described above, an interlaced video frame consists of a top field and a bottom field. The top field of the video frame comprises scan-lines 1, 3, 5 . . . etc, when counting from the top row of the video frame. The bottom field of the video frame comprises scan-lines 2, 4, 6 . . . etc, again, when counting from the top row of the video frame. As also described above, the top field or the bottom field of the video frame may be the dominant field of the frame, which is captured at time T.

The method 200 begins at step 220, where an output dominant field with timestamp T is generated by the processor 1705 based on the compositing tree generated at step 740. The output dominant field is stored in a first output buffer configured within memory 1706. A method 300 of generating an output dominant field at time T, as executed at step 220, will be explained below with reference to FIG. 3. At the next step 230, an output non-dominant field with timestamp T+Δ is generated by the processor 1705 based on the compositing tree generated at step 740. The output non-dominant field is stored in a second output buffer configured within memory 1706. A method 500 of generating an output non-dominant field at time T+Δ, as executed at step 230, will be explained below with reference to FIG. 5.

The method 200 continues at the next step 240, where the dominant field and non-dominant field of the output video frame are combined by the processor 1705 and interleaved to produce an output video frame with timestamp T.

The dominant field and non-dominant field may be combined at step 240 by copying the non-dominant field from the second output buffer to the first output buffer. The first output buffer may then be used as an output frame buffer. For example, if the field order of the output video frame is TFF, then pixel values at the scan-lines 2, 4, 6 . . . etc. from the second output buffer, may be copied to scan-lines 2, 4, 6 . . . etc. of the first output buffer. In contrast, if the field order of the output video frame is BFF, the pixel values at the scan-lines 1, 3, 5 . . . etc. from the second output buffer may be copied to scan-lines 1, 3, 5 . . . etc. of the first output buffer.

The first and second output buffers described above at steps 220 and 230, respectively, may be used to interleave the dominant and non-dominant fields of the output frame. The output frame may then be sent to an encoder, for example, for display on the display 1714. Such an encoder may be implemented as software resident on the hard disk drive 1710 and being controlled in its execution by the processor 1705. In one implementation, such an encoder may accept field data instead of requiring a full frame. In this instance, the dominant field may be selected from the first output buffer of step 220 and sent straight to the encoder. Similarly, the non-dominant field may be selected from the second output buffer of step 230 and sent straight to the encoder. Accordingly, when the encoder can accept field data, step 240 of the method 200 may not be required.

Figure 3:
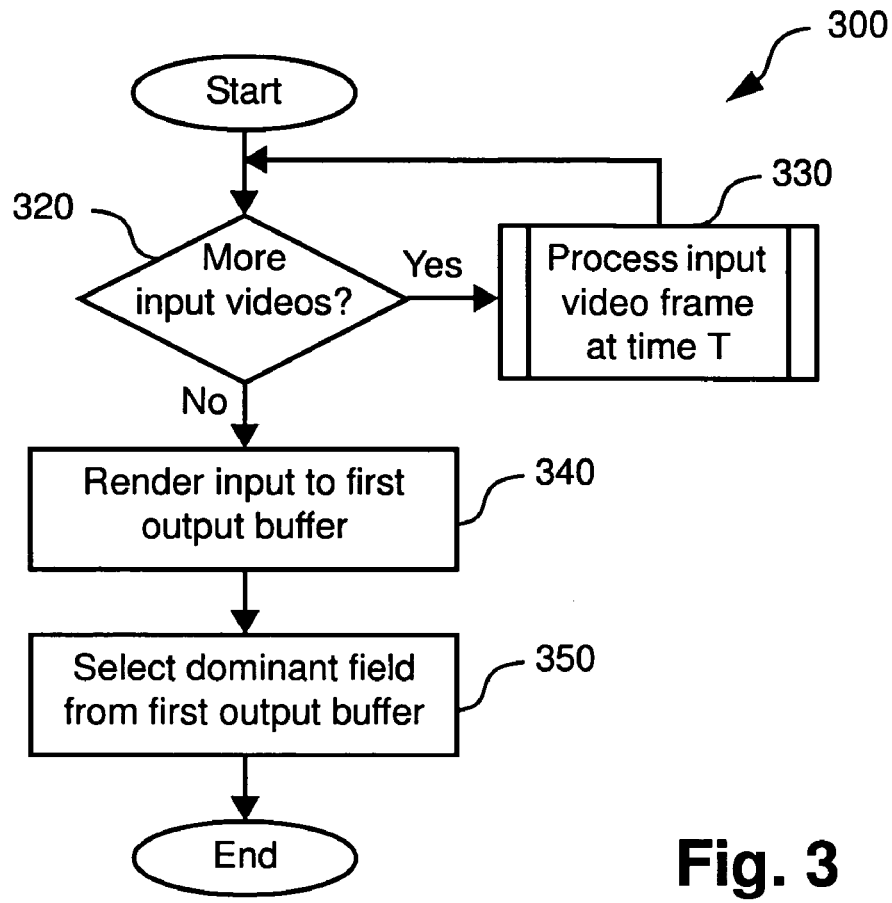
FIG. 3 is a flow diagram showing a method of generating an output dominant field at time T, as executed in the method of FIG. 2.

The method 300 of generating an output dominant field at time T, as executed at step 220, will now be explained with reference to FIG. 3. The method 300 may be implemented as software resident on the hard disk drive 1710 and being controlled in its execution by the processor 1705. The method 300 begins at step 320, where if the processor 1705 determines that there are more input video frames or graphical objects to be pre-processed, then the method 300 proceeds to step 330. Otherwise, the method 300 proceeds to step 340.

At step 330, an input video frame with timestamp T, which contains a dominant input field at time T as well as a non-dominant input field at time T+Δ is pre-processed for later rendering and the method 300 returns to step 320. The input video frame with timestamp T may be stored in a buffer configured within memory 1706, for example. A method 400 of pre-processing an input video frame for later rendering, as executed at step 330, will be described in detail with reference to FIG. 4. In the method 400, the top field of the input video frame is interpolated to an adjacent bottom field or the bottom field is interpolated to an adjacent top field, depending on the field order of the input video frame. Following pre-processing in accordance with the method 400, the input video frame may be rendered.

At the next step 340, all pre-processed input video frames, which may have been scaled and/or translated, are rendered together with graphical objects represented by graphical object nodes, according to the compositing tree generated at step 740. The result of step 340 is a composite output video frame, which is stored in the first output buffer. The graphical objects represented by the graphical object nodes may also be animated before rendering. In this instance, the size of the first output buffer is equal to the size of the output video frame.

The method 300 continues at the next step 350, where the dominant output field (i.e., the top field if the output field order is TFF and bottom field otherwise), is selected from the output video frame stored in the first output buffer. The dominant output field may be used to form the dominant output field of the interlaced output video frame as at step 240. Alternatively, the dominant output field selected at step 350 may be sent straight to an encoder, for example, if such an encoder is able to process individual fields. The method 300 concludes following step 350.

Figure 4:
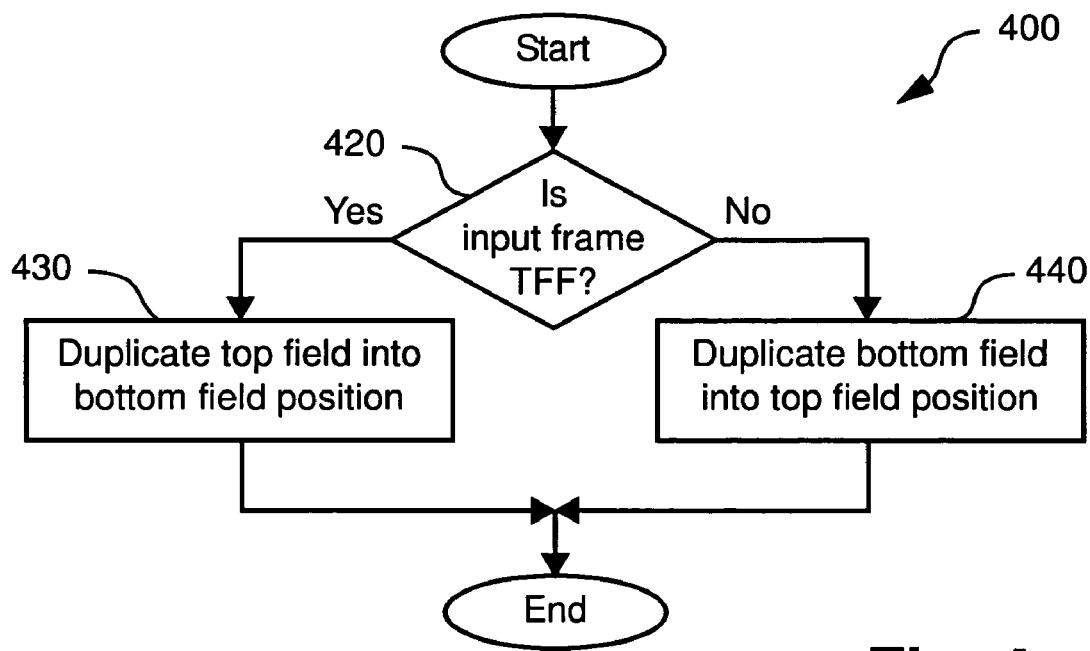
FIG. 4 is a flow diagram showing a method of pre-processing an input video frame for later rendering, as executed in the method of FIG. 3.

The method 400 of pre-processing an input video frame for later rendering as executed at step 330 will now be explained with reference to FIG. 4. The method 400 is preferably implemented as software resident on the hard disk drive 1710 and being controlled in its execution by the processor 1705. The method 400 begins at step 420, where if the processor 1705 determines that the field order of the input frame is TFF, then the method 400 proceeds to step 430. Otherwise, the method 400 proceeds to step 440.

Figure 13:
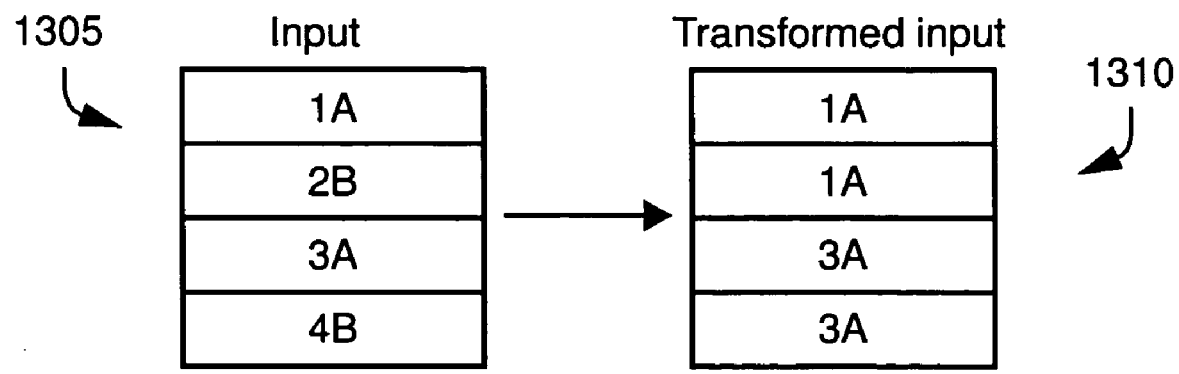
FIG. 13 shows an example where the top field of an input video frame has been interpolated to the adjacent bottom field position of the input video frame.

At step 430, the top field of the input video frame is interpolated to its adjacent bottom field position. The interpolation is preferably performed using duplication where scan-lines 1, 3, 5 . . . etc. of the input video frame are copied into scan-lines 2, 4, 6 . . . etc. of the input video frame. For example, FIG. 13 shows a video frame 1310 where scan-lines 1A and 3A of an input video frame 1305 have been copied over scan-lines 2B and 4B of the frame 1310.

Alternatively, the interpolation of the top field of the input video frame into the bottom field of the input video frame, as at step 440, may be performed without copying the scanlines. A method 1800 of interpolating the top field of a video frame into an adjacent bottom field position, without copying scanlines, will be described in detail below with reference to FIGS. 8 and 18.

Figure 14:
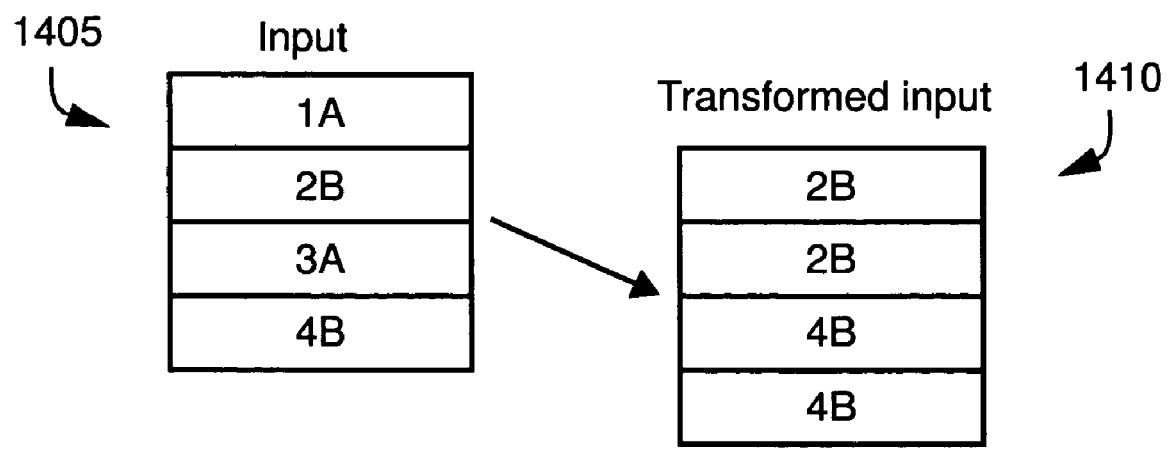
FIG. 14 shows an example where the bottom field of an input video frame has been interpolated to the adjacent top field position of the input video frame.

At step 440, the bottom field of the input video frame is interpolated to its adjacent top field position. Again, the interpolation is preferably performed at step 440 using duplication where scan-lines 2, 4, 6 . . . etc. of the input video frame are copied into scan-lines 1, 3, 5 . . . etc. of the input video frame. For example, FIG. 14 shows a frame 1410 where scan-lines 2B and 4B of an input video frame 1405 have been copied over scan-lines 1A and 3A of the frame 1410. Following either of steps 430 and 440 the method 400 concludes. Again, the interpolation of the bottom field of the input video frame into the top field of the input video frame, may alternatively be performed without copying the scanlines. A method 1900 of interpolating the bottom field of a video frame into an adjacent top field position, without copying scanlines, will be described in detail below with reference to FIGS. 9 and 19.

Figure 8:
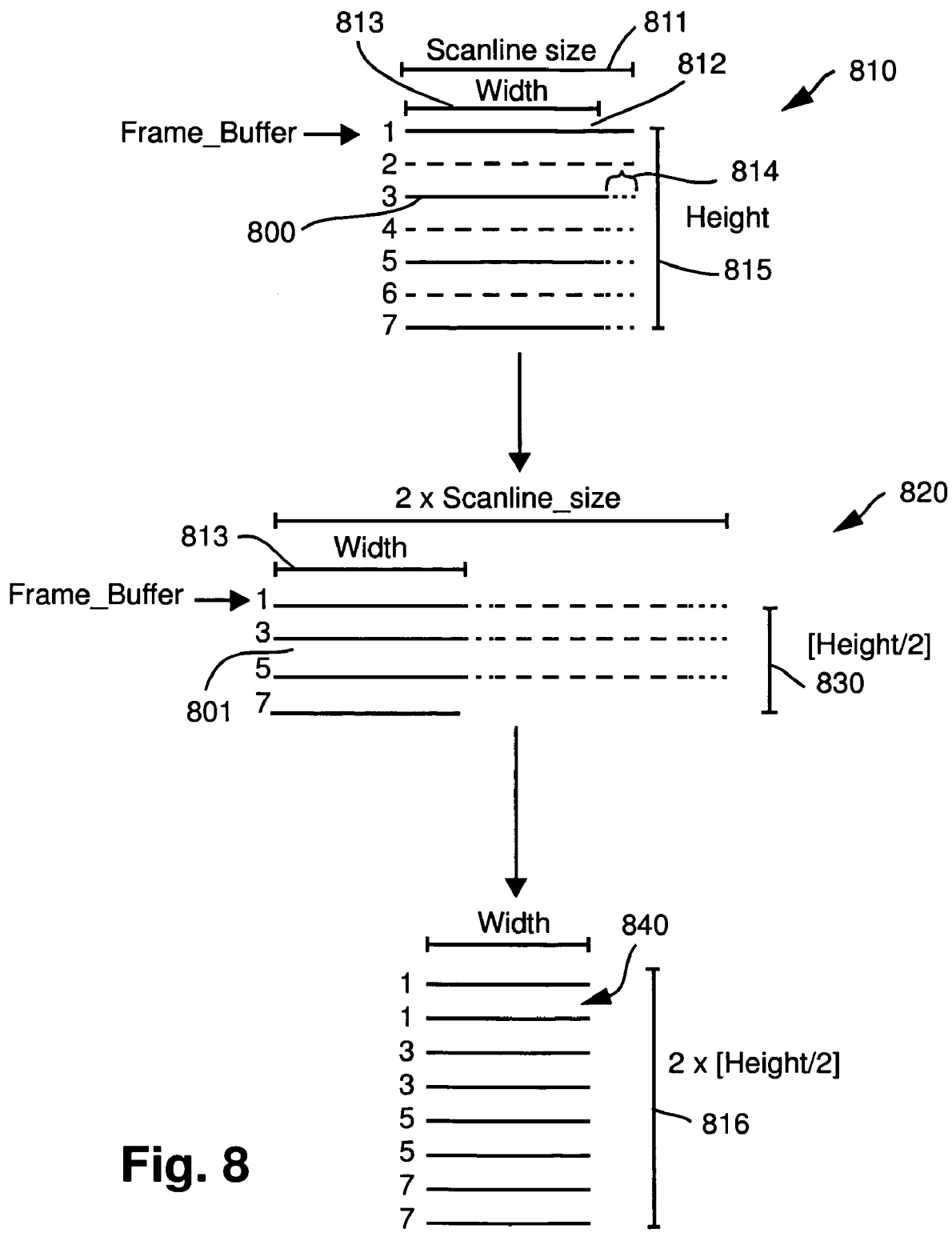
FIG. 8 shows an example of a video frame with an interpolated or duplicated top field.
Figure 18:
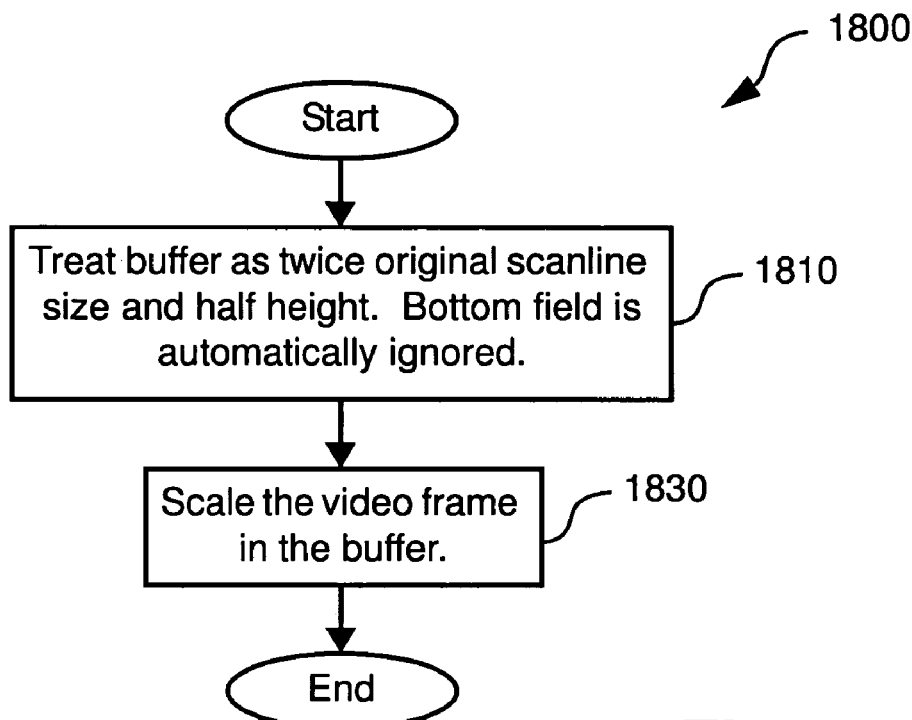
FIG. 18 shows a method of interpolating the top field of a video frame into an adjacent bottom field position.

The method 1800 of interpolating the top field of a video frame into an adjacent bottom field position, without copying scanlines, will now be described in detail below with reference to FIGS. 8 and 18. The method 1800 may be implemented as software resident on the hard disk drive 1710 and being controlled in its execution by the processor 1705. FIG. 8 shows a video frame 800 stored in a pixel buffer 810 as a plurality of scan-lines of pixel data (e.g., the scan-line 812). In the example of FIG. 8, the buffer 810 may have a scan-line size 811 that is greater than the width 813 of the video frame 800. As such, scan-line (e.g., 812) of the buffer 810 may have padding 814 at the end of each scan-line. The padding 814 is ignored during rendering. In the example of FIG. 8, the buffer 810 has a height 815 of seven scan-lines.

The method 1800 begins at step 1810, where during rendering of the video frame 800, the buffer 810 is notionally converted into a buffer 820 containing a video frame 801, as seen in FIG. 8. (In practice no actual conversion occurs; the contiguous block of memory making up the buffer 810 is simply treated as differently organised.) The buffer 820 has two times the original scan-line size 811 of the buffer 810. The video frame 801 has a width that is the same as the original width 813. The buffer 820 has a height 830 which is set to a ceiling of half of the original height 815 of the buffer 810. The ceiling of half of the original height 815 has been selected for the instance that the height 815 of the buffer 810 is an odd number of scan-lines. The scanlines 2, 4, 6 . . . etc. of the video frame 800 are treated as padding and are ignored in the buffer 820. The video frame 800 is considered for the purposes of rendering as only having scan-lines 1, 3, 5 . . . etc., in accordance with the image 801, as shown in FIG. 8. At the next step 1830, the processor 1705 scales the video frame 801 up vertically by a factor of two to generate a video frame 840, as shown in FIG. 8. Step 1830 may be implemented using the two-dimensional (2D) rendering system described above. The video frame 840 has a height 816, which is the same as the height 815 of the video frame 800 if that height is even. If the height 815 of the video frame 800 is odd, as in this example, the height 816 is the height 815 plus one. The video frame 840 represents the video frame 800 with an interpolated or duplicated top field.

Figure 9:
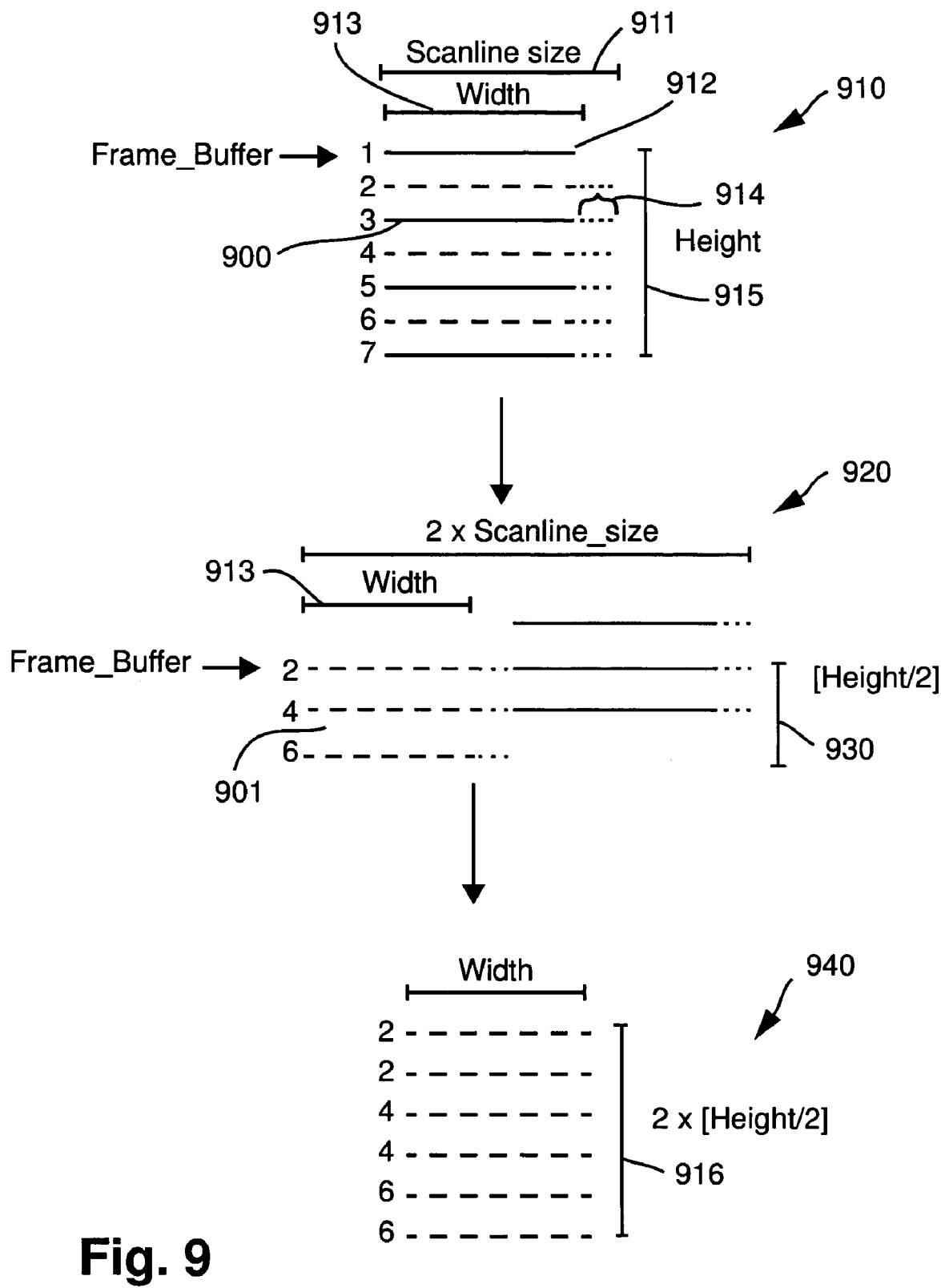
FIG. 9 shows an example of a video frame with an interpolated or duplicated bottom field.
Figure 19:
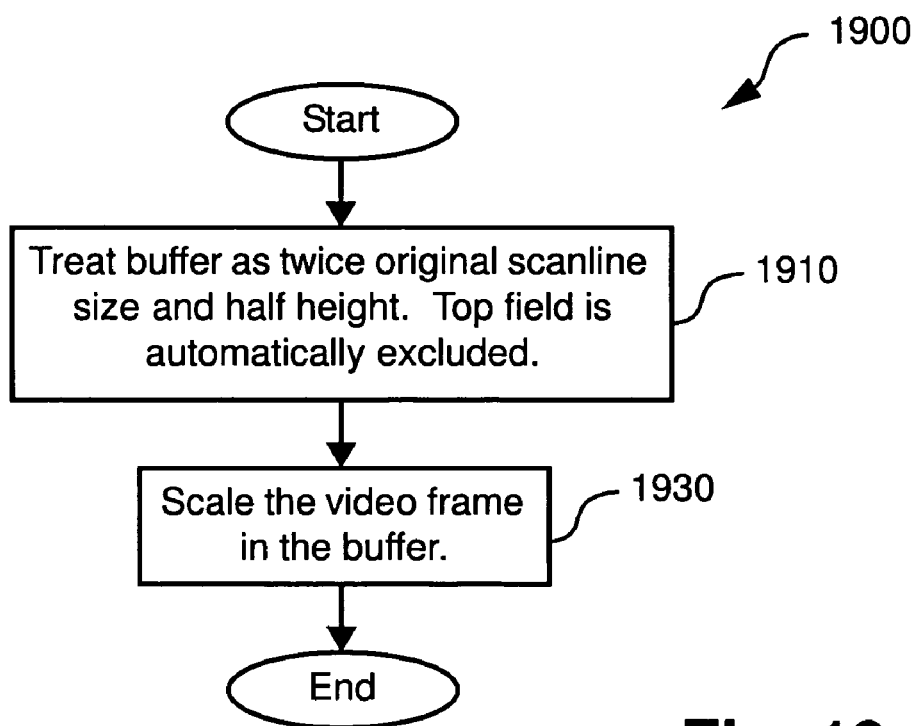
FIG. 19 shows a method of interpolating the bottom field of a video frame into an adjacent top field position.

The method 1900 of interpolating the bottom field of a video frame into an adjacent top field position, without copying scanlines, will now be described in detail below with reference to FIGS. 9 and 19. The method 1900 may be implemented as software resident on the hard disk drive 1710 and being controlled in its execution by the processor 1705. FIG. 9 shows a video frame 900 stored in a pixel buffer 910 as a plurality of scan-lines of pixel data (e.g., the scan-line 912). The buffer 910 may have a scan-line size 911 that is greater than a width 913 of the video frame 900. For example, each scan-line (e.g., 912) may have padding 914 at the end of each scan-line. Again, the padding 914 is ignored during rendering. The buffer 910 also has a height 915 of seven scan-lines.

The method 1900 begins at step 1910, where during rendering of the video frame 900, the buffer 910 is notionally converted into a buffer 920 containing a video frame 901, as seen in FIG. 9. (As described above, in practice no actual conversion occurs; the contiguous block of memory making up the buffer 910 is simply treated as differently organised.) The buffer 920 has two times the original scan-line size 911 of the buffer 910. The image 901 has a width that is the same as the original width 913. The buffer 920 has a height which is set to a floor of half of the original height 915 of the buffer 910. Again, the floor of half of the original height 915 has been selected for the instance that the height 915 of the buffer 910 is an odd number of scan-lines. The start point of the buffer 920 is moved to start of scanline 2 of the video frame 900. The scanlines 1, 3, 5 . . . etc. of the video frame 900 are treated as padding and are ignored in the buffer 920. The video frame 900 is considered for the purposes of rendering as only having scan-lines 2, 4, 6 . . . etc., in accordance with the video frame 901, as shown in FIG. 9. That is, the rendering system is instructed to ignore the whole of the first scanline in the buffer 920 At the next step 1930, the processor 1705 scales the video frame 901 up vertically by a factor of two to generate a video frame 940, as shown in FIG. 9. Step 1930 may be implemented using the two-dimensional (2D) rendering system described above. The video frame 940 has a height 916, which is the same as the height 915 of the video frame 900 if that height is even. If the height 915 of the video frame 900 is odd, as in this example, the height 916 is the height 915 minus one. The video frame 940 represents the video frame 900 with an interpolated or duplicated bottom field.

Figure 5:
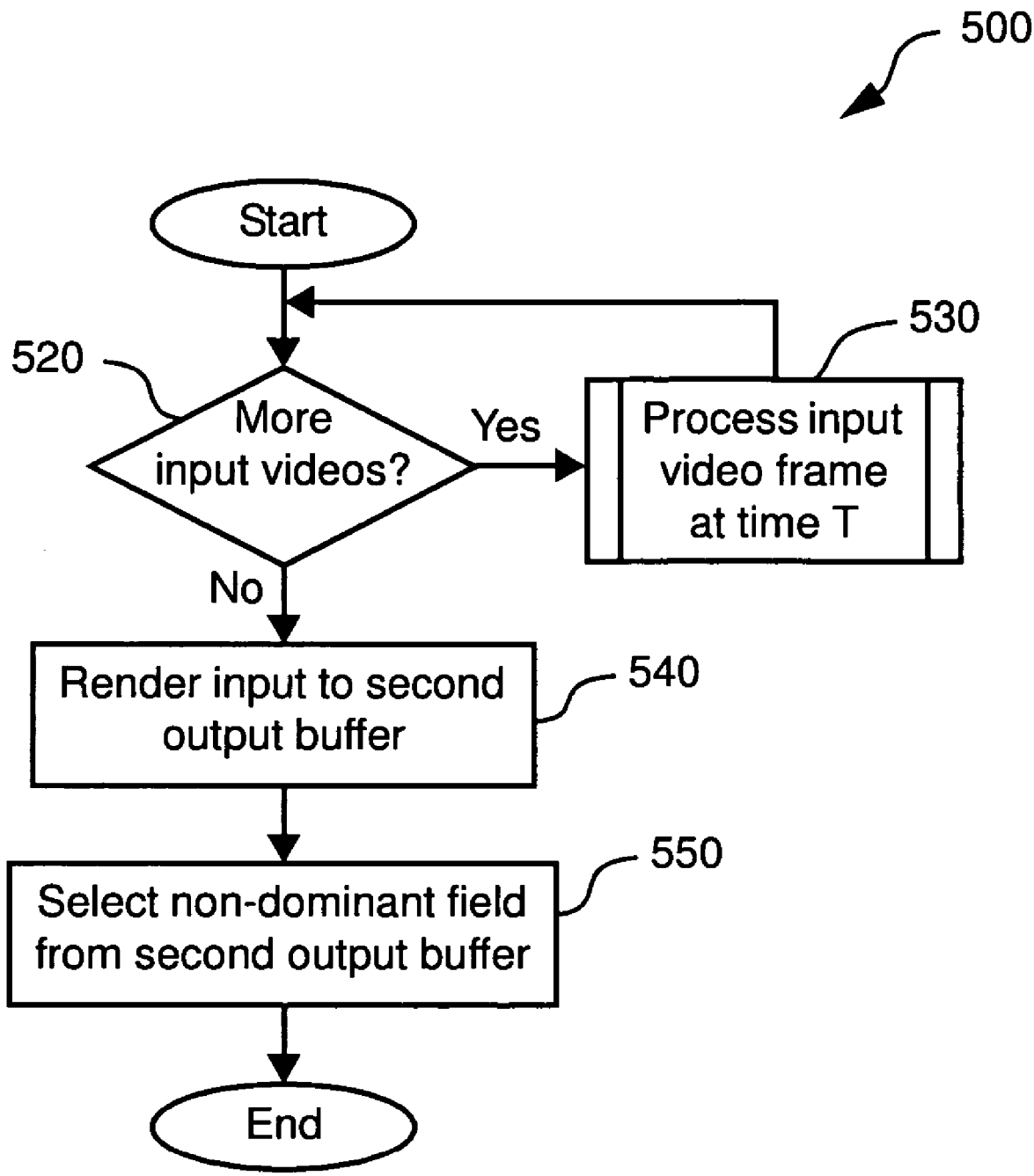
FIG. 5 is a flow diagram showing a method of generating an output non-dominant field at time T+Δ, as executed in the method of FIG. 2.

The method 500 of generating an output non-dominant field at time T+Δ, as executed at step 230, will now be explained with reference to FIG. 5. The method 500 may be implemented as software resident on the hard disk drive 1710 and being controlled in its execution by the processor 1705. The method 500 begins at step 520, where if the processor 1705 determines that there are more input video frames or graphical objects to be pre-processed, then the method 500 proceeds to step 530. Otherwise, the method 500 proceeds to step 540.

At step 530, an input video frame with timestamp T, which contains a non-dominant input field at time T+Δ as well as the dominant input field at time T is pre-processed for later rendering and the method 500 returns to step 520. The input video frame with timestamp T may be stored in memory 1706, for example. A method 600 of pre-processing an input video frame for later rendering, as executed at step 530, will be described in detail with reference to FIG. 6.

In the method 600, the top field of the input video frame is interpolated to an adjacent bottom field or the bottom field is interpolated to an adjacent top field, depending on the field order of the input video frame. The method 600 is similar to the method 400, except that the input video frame with an interpolated bottom field is shifted down by one pixel and the input video frame with an interpolated top field is shifted up by one pixel. Following pre-processing in accordance with the method 600, the input video frame may be rendered.

At the next step 540, all pre-processed input video frames, which may have been previously transformed by scaling and/or translation, are rendered together with any graphical objects represented by graphical object nodes, according to the compositing tree generated at step 740. The result of step 540 is a composite output video frame, which is stored in the second output buffer configured within memory 1706. The graphical objects represented by the graphical object nodes may also be animated before rendering. In this instance, the size of the second output buffer is equal to the size of the output video frame.

The method 500 continues at the next step 550, where the non-dominant output field (i.e., the bottom field if the field order of the output video frame is TFF and top field otherwise), is selected from the output video frame stored in the second output buffer. The non-dominant output field may be used to form the non-dominant output field of the interlaced output video frame as at step 240. Alternatively, the non-dominant output field selected at step 550 may be sent straight to an encoder, for example, if such an encoder is able to process individual fields. The method 500 concludes following step 550.

Figure 6:
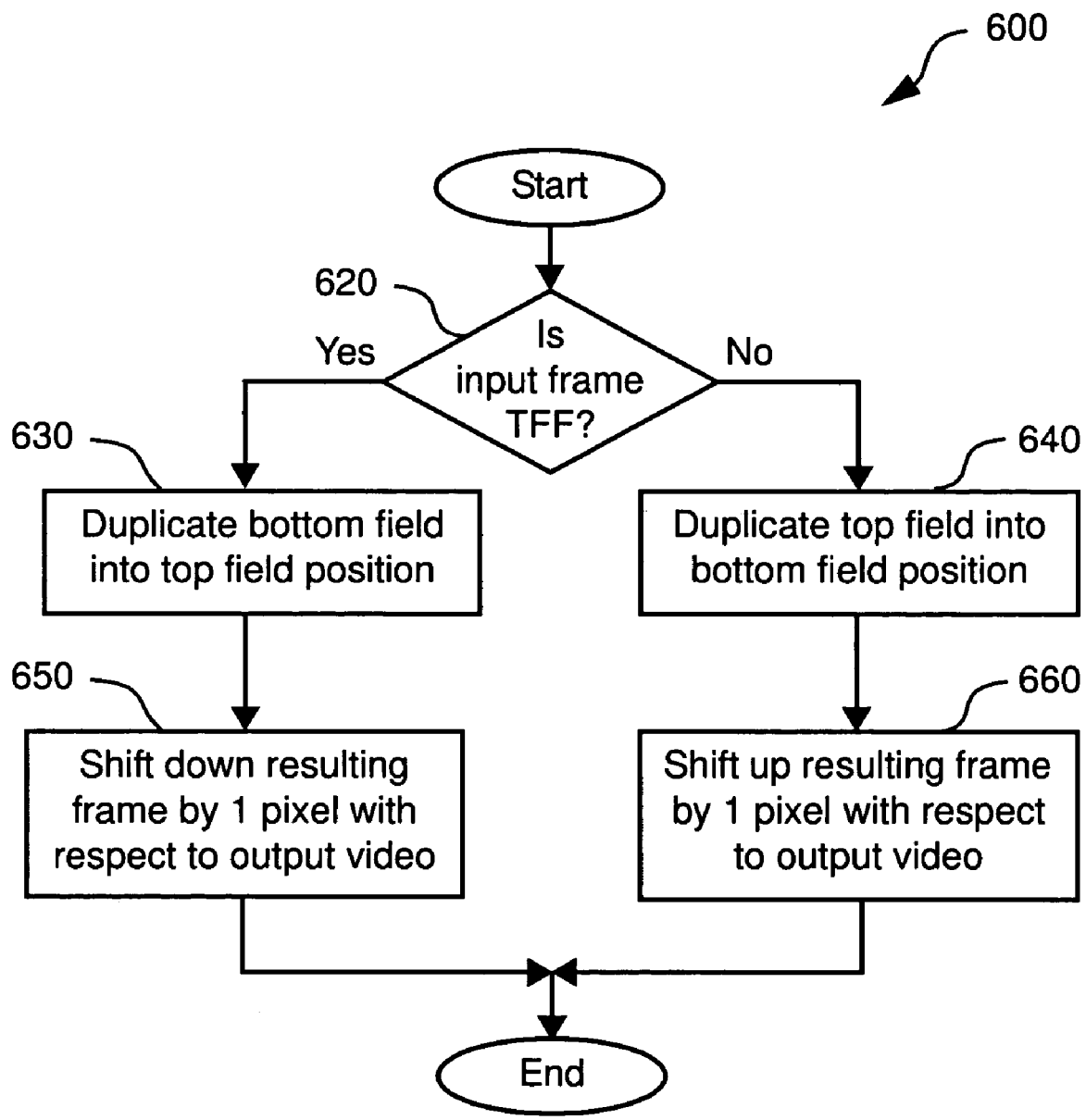
FIG. 6 is a flow diagram showing a method of pre-processing an input video frame for later rendering, as executed in the method of FIG. 5.

The method 600 of pre-processing an input video frame for later rendering, as executed at step 530, will now be explained with reference to FIG. 6. The method 600 may be implemented as software resident on the hard disk drive 1710 and being controlled in its execution by the processor 1705. The method 600 begins at step 620, where if the processor 1705 determines that the field order of the input frame is TFF, then the method 600 proceeds to step 630. Otherwise, the method 600 proceeds to step 640. At step 630, the bottom field of the input video frame is interpolated to its adjacent top field position. The interpolation is preferably performed using duplication where scan-lines 2, 4, 6 . . . etc. of the input video frame are copied into scan-lines 1, 3, 5 . . . etc. of the input video frame. Alternatively, the interpolation of the bottom field of the input video frame into the top field of the input video frame may be performed in accordance with the method 1900.

Figure 10A:
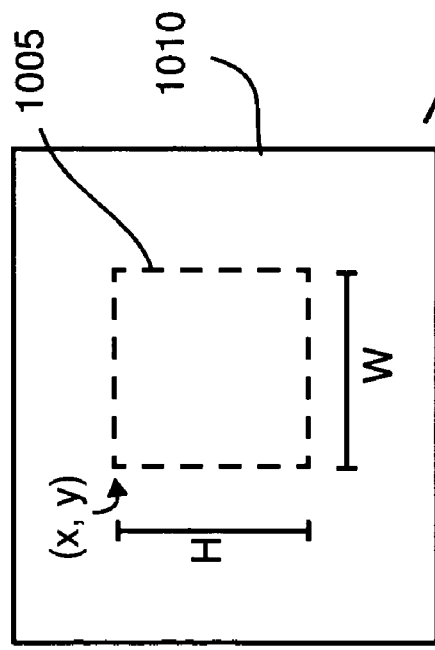
FIG. 10A shows a video frame prior to shifting.
Figure 10C:
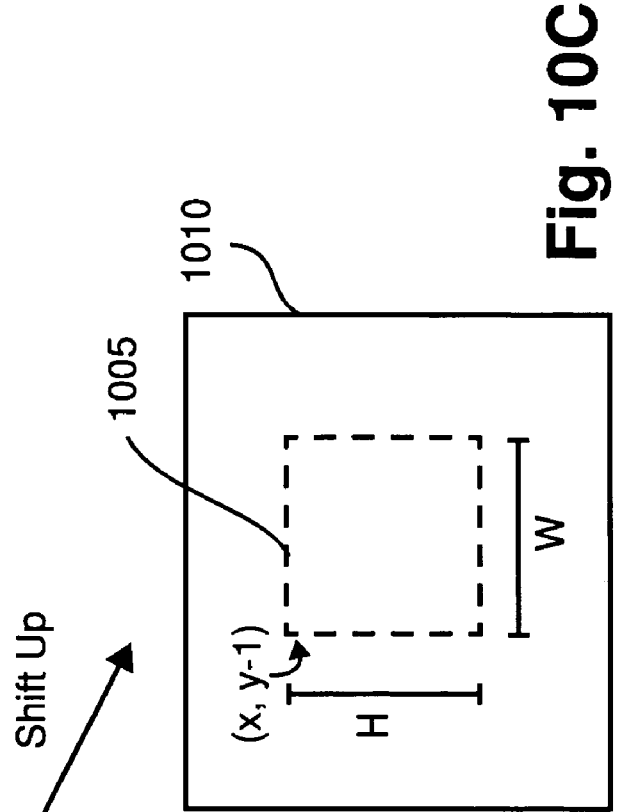
FIG. 10C shows the video frame of FIG. 10A shifted up by one pixel.
Figure 10B:
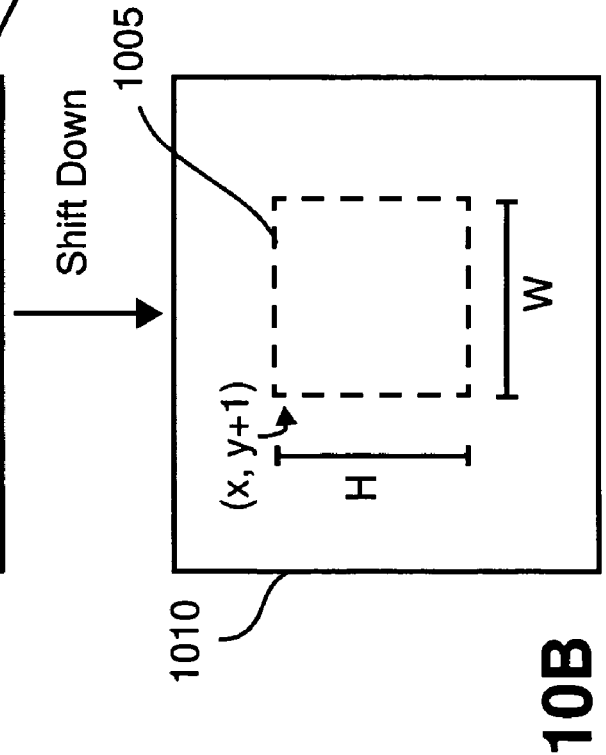
FIG. 10B shows the video frame of FIG. 10A shifted down by one pixel.

At the next step 650 of the method 600, the video frame interpolated at step 630 is shifted down by one pixel with respect to an output video bounding box associated with the video frame. For example, FIG. 10A shows a video frame 1005 prior to shifting. The video frame 1005 is shown in a bounding box 1010. In the example of FIG. 10A, the video frame 1005 has been transformed (e.g., scaled or translated), resulting in the video frame 1005 being rendered at point (X, Y) and only occupying a central portion of the bounding box 1010. The video frame 1005 may be shifted down by one pixel by a translation matrix operation applied to a video node associated with the video frame 1005, such that the video frame 1005 is rendered at point (X, Y+1), as shown in FIG. 10B. Such a translation matrix operation may be implemented using the two-dimensional rendering system described above. The video frame 1005 is shifted down in an output video coordinate system as opposed to an input video coordinate system.

The method 600 continues at step 640, where the top field of the input video frame is interpolated to its adjacent bottom field position. The interpolation may be performed using duplication where scan-lines 1, 3, 5 . . . etc. of the input video frame are copied into scan-lines 2, 4, 6 . . . etc. of the input video frame. Alternatively, the interpolation of the top field of the input video frame into the bottom field of the input video frame, may be performed in accordance with the method 1800. At the next step 660, the video frame interpolated at step 640 is shifted up by one pixel with respect to an output video bounding box associated with the video frame. For example, the video frame 1005 may be shifted up by one pixel by a translation matrix operation applied to a video node associated with the video frame 1005, such that the video frame 1005 is rendered at point (X, Y−1), as shown in FIG. 10C. Again, the video frame 1005 is shifted up in the output video coordinate system as opposed to the input video coordinate system. Following either of steps 650 and 660 the method 600 concludes.

Figure 15:
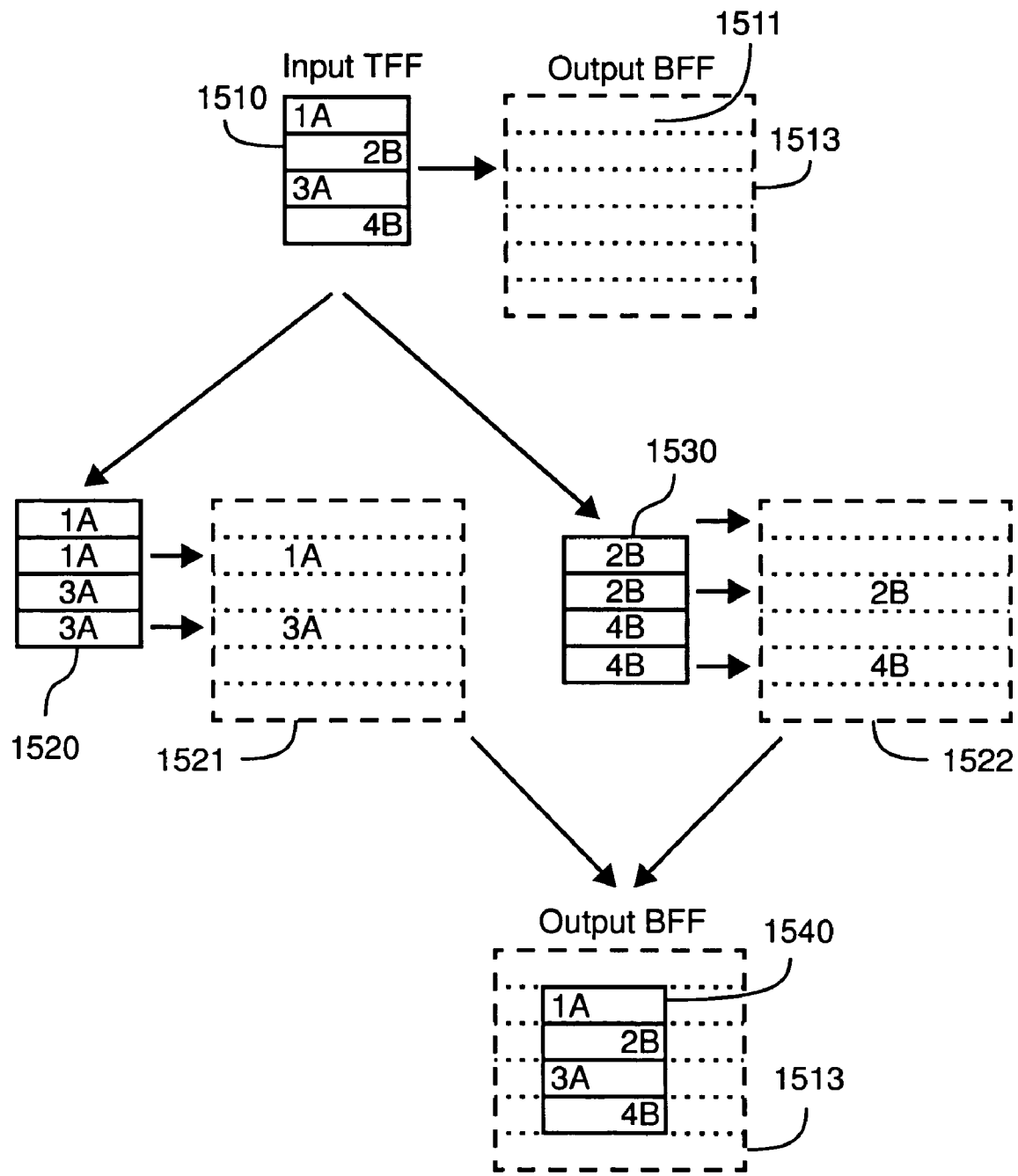
FIG. 15 shows an example of a BFF output video frame generated from a TFF input video frame.

FIG. 15 shows an example of a BFF output video frame 1540 generated from a TFF input video frame 1510. The input video frame 1510 has a TFF field order and is aligned with a first scan-line 1511 of an output video buffer 1513. The top field of the input video frame 1510 is duplicated, as at step 430 of the method 400, to generate the video frame 1520. The video frame 1520 is rendered to a first output buffer 1521, as at step 340 of the method 300. The output dominant (bottom) field of the video frame 1520 is then selected, as at step 350, to generate the scan-lines 1A and 3A in the first output buffer 1521, as shown in FIG. 15.

The bottom field of the input video frame 1510 is duplicated and shifted down, as at steps 630 and 650 of the method 600, to generate the video frame 1530, as shown in FIG. 15. The video frame 1530 is rendered to a second output buffer 1522, as at step 540 of the method 500. The non-dominant (top) field of the video frame 1530 is then selected, as at step 550, to generate the scan-lines 2B and 4B in the second output buffer 1522, as shown in FIG. 15. The dominant and non-dominant fields selected as described above are interleaved, as at step 240 of the method 200, to produce the output video frame 1540 rendered in the output buffer 1513 of FIG. 15. The output video frame 1540 is rendered in the output buffer 1513 one scan-line below the alignment of the input video frame 1510 with the buffer 1513. The rendering of the output video frame 1540 down one scan-line ensures that the field order of the input video frame 1510 is preserved in the output (i.e., the scan-lines 1A, 3A . . . etc. are rendered before the scan-lines 2B, 4B . . . etc.). The rendering of the output video frame 1540 down one scan-line compared to the input video frame 1510 is negligible and is much more aesthetically pleasing than if the fields of the video frame 1540 were rendered out of order. Accordingly, the methods described above are able to output an interlaced video frame having a different field order to the corresponding input video frame, where the top of the input video frame is aligned to the top of the output video frame. The methods described above are also able to output an interlaced video frame having a different field order to the corresponding input video frame, where the top of the input video frame is displaced vertically by any number of scanlines.

Figure 16:
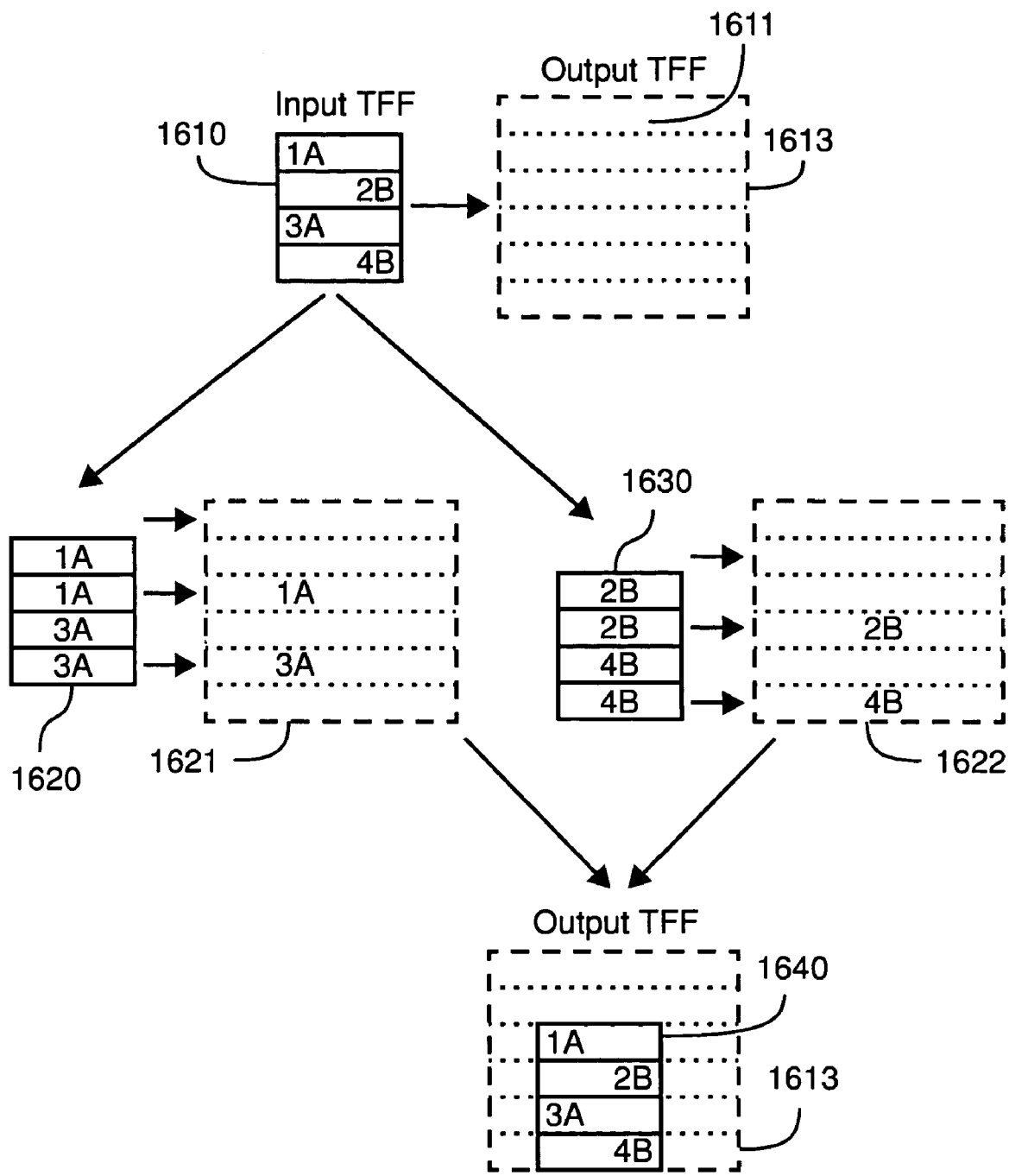
FIG. 16 shows an example of a TFF output video frame generated from a TFF input video frame, where the TFF input video frame is vertically displaced by one scan-line with respect to the TFF output video frame.

FIG. 16 shows an example of a TFF output video frame 1640 generated from a TFF input video frame 1610, where the TFF input video frame 1610 is aligned with the second scan-line of an output buffer 1613. The top field (i.e., scan-lines 1A, 3A . . . etc) of the input video frame 1610 is duplicated, as at step 430 of the method 400, to generate the video frame 1620. The video frame 1620 is rendered to a first output buffer 1621, as at step 340 of the method 300. The output dominant (top) field of the video frame 1620 is then selected, as at step 350, to generate the scan-lines 1A and 3A in the first output buffer 1621, as shown in FIG. 16.

The bottom field of the input video frame 1610 is duplicated and shifted down, as at steps 630 and 650 of the method 600, to generate the video frame 1630, as shown in FIG. 16. The video frame 1630 is rendered to a second output buffer 1622, as at step 540 of the method 500. The output non-dominant (bottom) field of the video frame 1630 is then selected, as at step 550, to generate the scan-lines 2B and 4B in the second output buffer 1622, as shown in FIG. 16. The dominant and non-dominant output fields selected as described above are interleaved, as at step 240 of the method 200, to produce the output video frame 1640 rendered in the output buffer 1613 of FIG. 16. The output video frame 1640 is rendered in the output buffer 1613 one scan-line below the original alignment of the input video frame 1610 with the buffer 1613. As described above, the rendering of the output video frame 1640 down one scan-line ensures that the field order of the input video frame 1610 is preserved in the output (i.e., the scan-lines 1A, 3A . . . etc. are rendered before the scan-lines 2B, 4B . . . etc.). Again, the rendering of the output video frame 1640 down one scan-line compared to the input video frame 1610 is negligible and is much more aesthetically pleasing than if the fields of the video frame 1640 were rendered out of order.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

In one implementation, when the output video frame is in field-by-field sequence instead of frame-by-frame sequence, the methods described above may be implemented accordingly. In this implementation, step 240, where the output fields are interleaved to produce the output frame at time T, is omitted.

In another variation, steps 340 and 540 only render their respective dominant and non-dominant fields rather than complete frames. In this variation, selection steps 350 and 550 may be omitted.

In a further variation, the input video streams may arrive field-by-field rather than frame-by-frame; thus the interpolation steps 430 or 440 and 630 and 640 may commence without the need for field separation. This variation is particularly suited to parallel processing of the fields.

The foregoing describes only some embodiments of the present invention, and modifications and/or changes can be made thereto without departing from the scope and spirit of the invention, the embodiments being illustrative and not restrictive.

The claims defining the invention are as follows:

1. A method of generating an interlaced video frame from one or more input video frames, said method comprising the steps of:
    interpolating a dominant field of each of said one or more input video frames;
    rendering a non-dominant field of each of the interpolated dominant fields;
    interpolating a non-dominant field of each of said one or more input video frames;
    rendering a dominant field of each of the interpolated non-dominant fields; and
    generating said interlaced video frame by combining the rendered dominant and non-dominant fields.

2. A method according to claim 1, wherein interpolation of the dominant field comprises copying the dominant field of each of said one or more input video frames into a corresponding non-dominant field position.

3. A method according to claim 1, wherein interpolation of the non-dominant field comprises copying the non-dominant field of each of said one or more input video frames into a corresponding dominant field position.

4. A method according to claim 1, wherein said generating step comprises the subs-steps of:

selecting a dominant output field from the rendered interpolated dominant fields; selecting a non-dominant output field from the rendered non-dominant fields; and generating said interlaced video frame by combining the selected dominant and non-dominant output fields.

5. A method according to claim 1, wherein the step of interpolating the dominant field comprises the sub-step of scaling the dominant field while ignoring the non-dominant field.

6. A method according to claim 1, wherein the step of interpolating the non-dominant field comprises the sub-step of scaling the non-dominant field while ignoring the dominant field.

7. A method according to claim 1, comprising the further step of shifting the non-interpolated dominant fields.

8. A method according to claim 7, wherein the fields are shifted by a two-dimensional renderer.

9. A method according to claim 7, wherein the non-interpolated dominant fields are shifted up by one pixel.

10. A method according to claim 7, wherein the non-interpolated dominant fields are shifted down by one pixel.

11. A method according to claim 1, wherein the field order of at least one of said input video frames is different from the field order of the output video frames.

12. A method according to claim 1, wherein the interpolation of said fields is performed by a two dimensional renderer.

13. A method according to claim 1, wherein said interlaced video frame is generated according to one or more non-video graphical objects.

14. A method of generating an interlaced video frame from one or more input video frames, said method comprising the steps of:
interpolating a dominant field of each of said one or more input video frames; rendering each of the interpolated dominant fields to form a first rendered frame; interpolating a non-dominant field of each of said one or more input video frames; rendering each of the interpolated non-dominant fields to form a second rendered frame;
selecting a dominant output field from said first rendered frame;
selecting a non-dominant output field from said second rendered frame; and generating said interlaced video frame by combining the selected dominant and non-dominant output fields.

15. A method of generating an interlaced video frame from one or more input video frames, said method comprising the steps of:
copying a dominant field of each of said one or more input video frames into a corresponding non-dominant field position to form one or more interpolated video frames;
copying a non-dominant field of each of said one or more input video frames into a corresponding dominant field position to form one or more further interpolated video frames;
rendering each of said one or more interpolated video frames and said one or more further interpolated video frames; and
generating said interlaced video frame by combining the rendered interpolated video frames.

16. A method of outputting one or more video fields from one or more input video frames, said method comprising the steps of:
interpolating a dominant field of each of said one or more input video frames; rendering each of the interpolated dominant fields to form a first rendered frame; interpolating a non-dominant field of each of said one or more input video frames; rendering each of the interpolated non-dominant fields to form a second rendered frame;
selecting a dominant output field from said first rendered frame;
selecting a non-dominant output field from said second rendered frame; and outputting said one or more dominant output field and said one or more non-dominant output field.

17. An apparatus for generating an interlaced video frame from one or more input video frames, said apparatus comprising:
dominant field interpolation means for interpolating a dominant field of each of said one or more input video frames;
first rendering means for rendering a non-dominant field of each of the interpolated dominant fields;
non-dominant field interpolation means for interpolating a non-dominant field of each of said one or more input video frames;
second rendering means for rendering a dominant field of each of the interpolated non-dominant fields; and
video generating means for generating said interlaced video frame by combining the rendered dominant and non-dominant fields.

18. An apparatus for generating an interlaced video frame from one or more input video frames, said apparatus comprising:
dominant field interpolation means for interpolating a dominant field of each of said one or more input video frames;
first rendering means for rendering each of the interpolated dominant fields to form a first rendered frame;
non-dominant field interpolation means for interpolating a non-dominant field of each of said one or more input video frames;
second rendering means for rendering each of the interpolated non-dominant fields to form a second rendered frame;
dominant output field selection means for selecting a dominant output field from said first rendered frame;
non-dominant output field selection means for selecting a non-dominant output field from said second rendered frame; and
video generating means for generating said interlaced video frame by combining the selected dominant and non-dominant output fields.

19. An apparatus for generating an interlaced video frame from one or more input video frames, said apparatus comprising:
dominant field copying means for copying a dominant field of each of said one or more input video frames into a corresponding non-dominant field position to form one or more interpolated video frames;
non-dominant field copying means for copying a non-dominant field of each of said one or more input video frames into a corresponding dominant field position to form one or more further interpolated video frames;
rendering means for rendering each of said one or more interpolated video frames and said one or more further interpolated video frames; and
video generating means for generating said interlaced video frame by combining the rendered interpolated video frames.

20. An apparatus for outputting one or more video fields from one or more input video frames, said apparatus comprising:

dominant field interpolation means for interpolating a dominant field of each of said one or more input video frames;

first rendering means for rendering each of the interpolated dominant fields to form a first rendered frame;

non-dominant field interpolation means for interpolating a non-dominant field of each of said one or more input video frames;

second rendering means for rendering each of the interpolated non-dominant fields to form a second rendered frame;

dominant output field selection means for selecting a dominant output field from said first rendered frame;

non-dominant output field selection means for selecting a non-dominant output field from said second rendered frame; and field output means for outputting said one or more dominant output field and said one or more non-dominant output field.

21. A computer readable storage medium, having a program recorded thereon, wherein the program is configured to make a computer execute a procedure to generate an interlaced video frame from one or more input video frames, said program comprising:

code for interpolating a dominant field of each of said one or more input video frames;

code for rendering a non-dominant field of each of the interpolated dominant fields;

code for interpolating a non-dominant field of each of said one or more input video frames;

code for rendering a dominant field of each of the interpolated non-dominant fields; and code for generating said interlaced video frame by combining the rendered dominant and non-dominant fields.

22. A computer-readable storage medium, having a program recorded thereon, wherein the program is configured to make a computer execute a procedure to generate an interlaced video frame from one or more input video frames, said program comprising:

code for interpolating a dominant field of each of said one or more input video frames;

code for rendering each of the interpolated dominant fields to form a first rendered frame;

code for interpolating a non-dominant field of each of said one or more input video frames;

code for rendering each of the interpolated non-dominant fields to form a second rendered frame;

code for selecting a dominant output field from said first rendered frame;

code for selecting a non-dominant output field from said second rendered frame; and code for generating said interlaced video frame by combining the selected dominant and non-dominant output fields.

23. A computer-readable storage medium, having a program recorded thereon, wherein the program is configured to make a computer execute a procedure to generate an interlaced video frame from one or more input video frames, said program comprising:

code for copying a dominant field of each of said one or more input video frames into a corresponding non-dominant field position to form one or more interpolated video frames;

code for copying a non-dominant field of each of said one or more input video frames into a corresponding dominant field position to form one or more further interpolated video frames;

code for rendering each of said one or more interpolated video frames and said one or more further interpolated video frames; and code for generating said interlaced video frame by combining the rendered interpolated video frames.

24. A computer readable storage medium, having a program recorded thereon, wherein the program is configured to make a computer execute a procedure to output one or more video fields from one or more input video frames, said program comprising:

code for interpolating a dominant field of each of said one or more input video frames;

code for rendering each of the interpolated dominant fields to form a first rendered frame;

code for interpolating a non-dominant field of each of said one or more input video frames;

code for rendering each of the interpolated non-dominant fields to form a second rendered frame;

code for selecting a dominant output field from said first rendered frame;

code for selecting a non-dominant output field from said second rendered frame; and code for outputting said one or more dominant output field and said one or more non-dominant output field.

25. A computer program product having a computer readable storage medium having a computer program recorded therein for generating an interlaced video frame from one or more input video frames, said computer program product comprising:

computer program code means for interpolating a dominant field of each of said one or more input video frames;

computer program code means for rendering a non-dominant field of each of the interpolated dominant fields;

computer program code means for interpolating a non-dominant field of each of said one or more input video frames;

computer program code means for rendering a dominant field of each of the interpolated non-dominant fields; and computer program code means for generating said interlaced video frame by combining the rendered dominant and non-dominant fields.

26. A computer program product having a computer readable storage medium having a computer program recorded therein for generating an interlaced video frame from one or more input video frames, said computer program product comprising:

computer program code means for interpolating a dominant field of each of said one or more input video frames;

computer program code means for rendering each of the interpolated dominant fields to form a first rendered frame;

computer program code means for interpolating a non-dominant field of each of said one or more input video frames;

computer program code means for rendering each of the interpolated non-dominant fields to form a second rendered frame;

computer program code means for selecting a dominant output field from said first rendered frame;

computer program code means for selecting a non-dominant output field from said second rendered frame; and computer program code means for generating said interlaced video frame by combining the selected dominant and non-dominant output fields.

27. A computer program product having a computer readable storage medium having a computer program recorded therein for generating an interlaced video frame from one or more input video frames, said computer program product comprising:

computer program code means for copying a dominant field of each of said one or more input video frames into a corresponding non-dominant field position to form one or more interpolated video frames;

computer program code means for copying a non-dominant field of each of said one or more input video frames into a corresponding dominant field position to form one or more further interpolated video frames;

computer program code means for rendering each of said one or more interpolated video frames and said one or more further interpolated video frames; and computer program code means for generating said interlaced video frame by combining the rendered interpolated video frames.

28. A computer program product having a computer readable storage medium having a computer program recorded therein for outputting one or more video fields from one or more input video frames, said computer program product comprising:

computer program code means for interpolating a dominant field of each of said one or more input video frames;

computer program code means for rendering each of the interpolated dominant fields to form a first rendered frame;

computer program code means for interpolating a non-dominant field of each of said one or more input video frames;

computer program code means for rendering each of the interpolated non-dominant fields to form a second rendered frame;

computer program code means for selecting a dominant output field from said first rendered frame;

computer program code means for selecting a non-dominant output field from said second rendered frame; and computer program code means for outputting said one or more dominant output field and said one or more non-dominant output field.

* * * * *